(12) United States Patent
Andersen et al.

(10) Patent No.: US 9,300,117 B2
(45) Date of Patent: *Mar. 29, 2016

(54) SERVICE ACCESS POINT FOR A UNINTERRUPTIBLE POWER SUPPLY

(71) Applicant: SCHNEIDER ELECTRIC IT CORPORATION, West Kingston, RI (US)

(72) Inventors: Claus Aabjerg Andersen, Kolding (DK); Yawei Du, Shanghai (CN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 305 days.

This patent is subject to a terminal disclaimer.

(21) Appl. No.: 14/042,048

(22) Filed: Sep. 30, 2013

(65) Prior Publication Data

US 2014/0029168 A1 Jan. 30, 2014

Related U.S. Application Data

(63) Continuation of application No. 13/033,738, filed on Feb. 24, 2011, now Pat. No. 8,546,689.

(51) Int. Cl.
*H02B 1/20* (2006.01)
*H02J 9/04* (2006.01)

(52) U.S. Cl.
CPC .... *H02B 1/20* (2013.01); *H02J 9/04* (2013.01)

(58) Field of Classification Search
CPC ..................................... H02B 1/20; H02J 9/04
USPC ........ 174/68.2, 72 B, 71 B, 88 B, 70 B, 99 B, 174/129 B, 133 B, 149 B; 361/600–678
See application file for complete search history.

(56) References Cited

U.S. PATENT DOCUMENTS 5,081,367 A * 1/1992 Smith ..................... H02J 9/062
307/64
5,162,616 A * 11/1992 Swaffield ............... H01R 25/14
174/70 B (Continued)

FOREIGN PATENT DOCUMENTS

WO 2009/088755 A1 7/2009
WO 2010/097787 A1 9/2010

OTHER PUBLICATIONS

International Search Report from corresponding PCT/US2012/026107 mailed Oct. 24, 2012.

*Primary Examiner* — Zachary M Pape
(74) *Attorney, Agent, or Firm* — Lando & Anastasi, LLP

(57) ABSTRACT

A power system including an uninterruptible power system (UPS) and a maintenance bypass panel (MBP) The UPS has an input to receive input power and an output to provide output power. The MBP has an input to receive the output power provided by the UPS and an output to provide the input power to the input of the UPS. A busbar is configured to couple one of the input of the UPS to the output of the MBP and the output of the UPS to the input of the MBP. The busbar has a first region to couple to one of the input and the output of the UPS, a second region to couple to one of the input and the output of the MBP, and a measurement region. A cover shields the busbar from inadvertent contact and includes a small diameter aperture to permit access to the measurement region of the busbar.

20 Claims, 17 Drawing Sheets

(56) References Cited

U.S. PATENT DOCUMENTS

| | | | |
|---|---|---|---|
| 5,686,768 A * | 11/1997 | Thomsen | H02J 9/062 307/64 |
| 5,982,652 A | 11/1999 | Simonelli et al. | |
| 6,888,066 B1 * | 5/2005 | Wiant | H02B 1/21 174/68.2 |
| 7,595,445 B2 * | 9/2009 | Legendre | H02G 5/06 174/27 |
| 8,420,935 B2 * | 4/2013 | Malkowski, Jr. | H02B 1/21 174/68.2 |
| 9,147,506 B2 * | 9/2015 | Okada | H01R 43/16 |
| 2005/0164563 A1 | 7/2005 | Schuttler et al. | |
| 2011/0140523 A1 * | 6/2011 | Ziegler | H02J 9/062 307/44 |

* cited by examiner

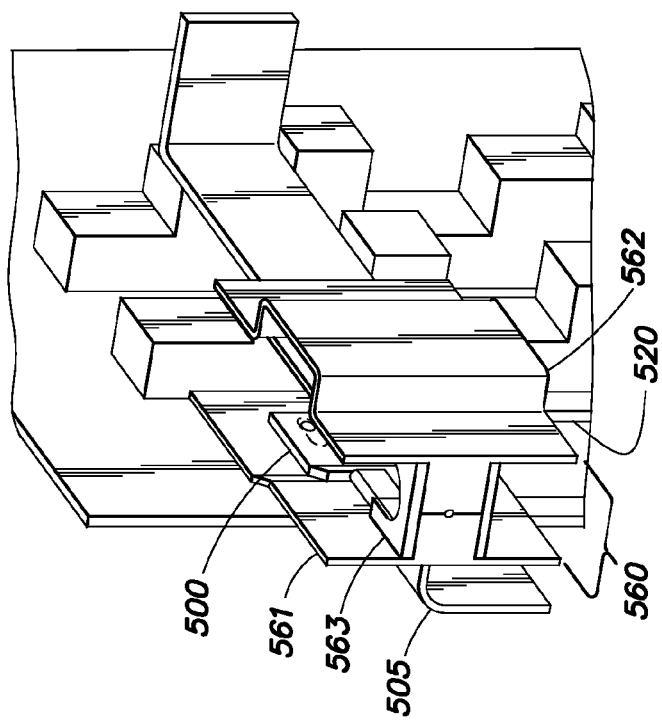
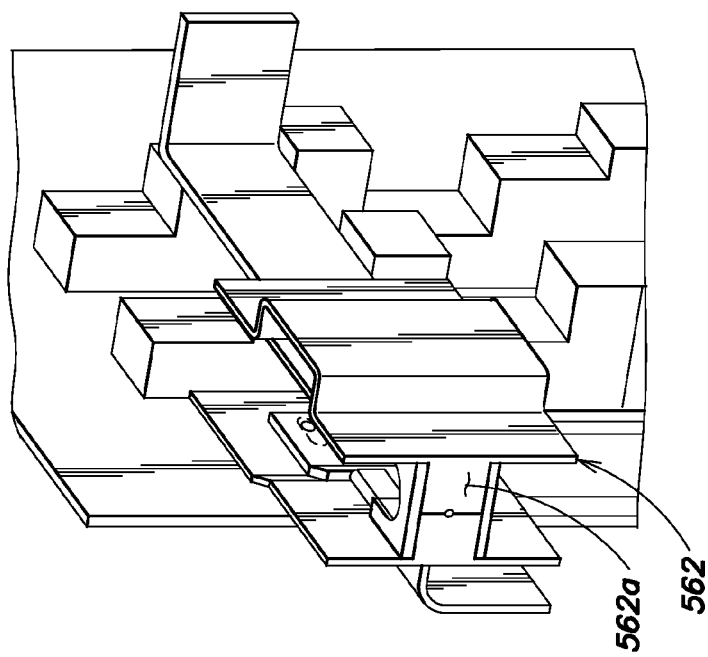

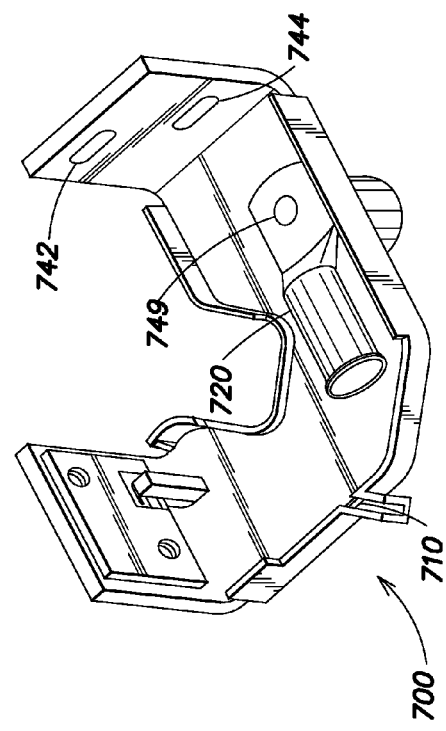
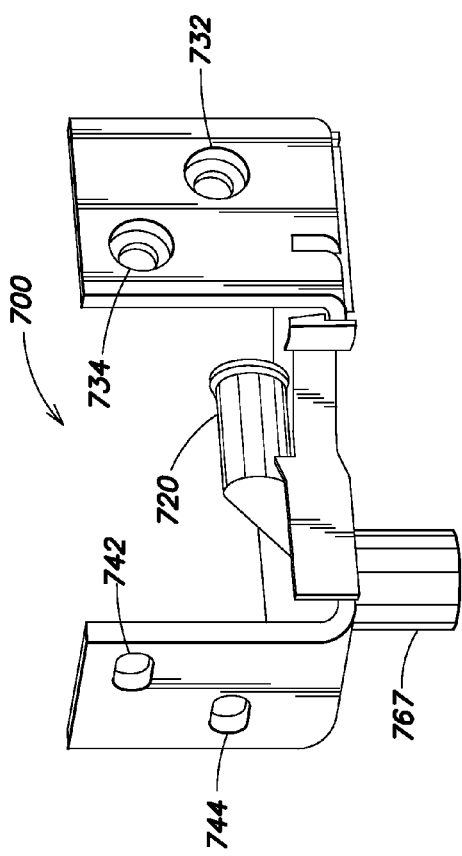
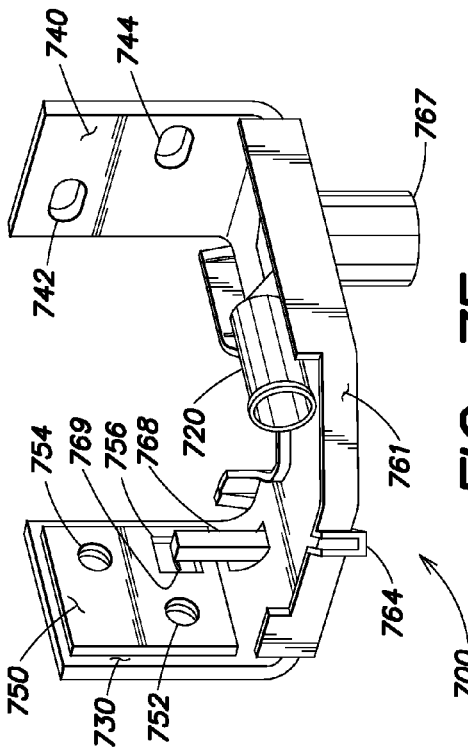

SERVICE ACCESS POINT FOR A UNINTERRUPTIBLE POWER SUPPLY

CROSS-REFERENCE TO RELATED APPLICATIONS

This application is a continuation under 35 U.S.C. §120 of U.S. patent application Ser. No. 13/033,738, titled "SERVICE ACCESS POINT FOR A UNINTERRUPTIBLE POWER SUPPLY," filed Feb. 24, 2011, which is hereby incorporated by reference in its entirety.

BACKGROUND OF THE INVENTION

1. Field of the Invention

The present invention relates generally to a system for providing redundant power to critical loads.

2. Discussion of the Related Art

The use of an uninterruptible power system (UPS) to provide power to a critical load is well known. Known uninterruptible power systems include on-line UPS's and off-line UPS's. On-line UPS's provide conditioned AC power as well as back-up AC power upon interruption of a primary source of AC power. Off-line UPS's typically do not provide conditioning of input AC power, but do provide back-up AC power upon interruption of the primary AC power source. FIG. 1 shows a block diagram of one type of on-line UPS. Other on-line UPS's are described in U.S. Pat. No. 5,982,652, and U.S. Pat. No. 5,686,768, each of which is incorporated herein by reference. On-line UPS's of the type described in the referenced patents are available from American Power Conversion Corporation, West Kingston, R.I. under the trade names Symmetra and Silicon. The UPS 10A of FIG. 1 includes an input circuit breaker/filter 12, a rectifier 14, a control switch 15, a controller 16, a battery 18, an inverter 20, an isolation transformer 22, and a bypass switch 23. The UPS also includes an input 24 for coupling to an AC power source 1, and an output 26 for coupling to a load.

The UPS 10A operates as follows. The circuit breaker/filter 12 receives input AC power from the AC power source 1 through the input 24, filters the input AC power and provides filtered AC power to the rectifier 14. The rectifier rectifies the input voltage. The control switch 15 receives the rectified power and also receives DC power from the battery 18. The controller 16 determines whether the power available from the rectifier is within predetermined tolerances, and if so, controls the control switch to provide the power from the rectifier to the inverter 20. If the power from the rectifier is not within the predetermined tolerances, which may occur because of "brown out" or "black out" conditions, or due to power surges, then the controller controls the control switch to provide the DC power from the battery to the inverter 20.

The inverter 20 of the UPS 10A receives DC power and converts the DC power to AC power and regulates the AC power to predetermined specifications. The inverter 20 provides the regulated AC power to the isolation transformer 22. The isolation transformer is used to increase or decrease the voltage of the AC power from the inverter and to provide isolation between a load and the UPS. The isolation transformer is typically an optional device, the use of which is typically dependent on UPS output power specifications. Depending on the capacity of the battery and the power requirements of the load, the UPS 10A can provide power to the load during brief power source dropouts or for extended power outages. The bypass switch 23 is used to provide a bypass of UPS circuitry to provide the input power directly to the output 26. The bypass switch may be controlled by the controller 16 to provide bypass of the UPS circuitry upon a failure condition of the UPS.

To provide further power redundancy, it is known to use a second power source to supply power to a bypass switch of a UPS from a second source of AC power. Systems of this type are often referred to as dual mains systems. FIG. 2 shows a dual mains UPS 10B that is similar to UPS 10A except that it includes a second input 25 to couple to a second power source 2, and UPS 10B includes a bypass switch 23 that selectively couples the second input directly to the output 26 of the UPS 10B. In dual mains systems, typically, a utility power source is coupled to the first power input 24 of the system and a backup power source, such as a generator is coupled to the second power input 25 of the system. Upon failure of the utility power source, the power system is able to continue to provide power to a load using the battery mode of operation of the UPS, while the generator is powered on and brought to full output voltage. Once the generator is on line, the power system can continue to provide output power in a bypass mode for an extended period of time from the generator.

Dual mains systems may also be used with both power inputs coupled to the same source of input power, but through separate fuses and/or circuit breakers. For many types of power failures, the power will be lost at both input 24 and input 25, but situations may exist, such as a blown fuse or circuit breaker, where power is lost at only input 24, and the bypass switch 23 can be used to continue to provide output power to a load.

SUMMARY OF THE INVENTION

In accordance with an aspect of the present invention, a high availability power system is provided. The high availability power system includes an uninterruptible power system having an input to receive input power and an output to provide output power, a maintenance bypass panel, a busbar, and cover. The maintenance bypass panel has an input to receive the output power provided by the uninterruptible power system and an output to provide the input power to the input of the uninterruptible power system. The busbar is formed from a conductive material and configured to electrically and mechanically couple one of the input of the uninterruptible power system to the output of the maintenance bypass panel and the output of the uninterruptible power system to the input of the maintenance bypass panel. The busbar has a first contact region defined at a first end of the busbar and configured to electrically and mechanically couple to one of the input and the output of the uninterruptible power system, a second contact region defined at a second end of the busbar that opposes the first end of the busbar and configured to electrically and mechanically couple to one of the input and the output of the maintenance bypass panel, and a measurement access region defined between the first contact region and the second contact region. The cover is formed from an insulating material and is configured to be attached to the busbar and to shield the busbar from contact with objects having a diameter greater than approximately four millimeters. The cover includes a measurement aperture having an opening that is approximately four millimeters or less in diameter that is configured to permit access to the measurement access region of the busbar.

In accordance with an aspect of the present invention, the one of the input and the output of the uninterruptible power system can be electrically and mechanically decoupled from the one of the output and the input of the maintenance bypass panel without physically accessing any portion of the maintenance bypass panel.

In accordance with another aspect of the present invention, the busbar and the cover are constructed and arranged to permit a current clamp to be placed about the measurement access region of the busbar and measure a current carried by the busbar while the cover is attached to the busbar.

In accordance with one embodiment, the first contact region of the busbar includes a first plurality of apertures each to receive a respective first fastener that electrically and mechanically couples the first contact region of the busbar to the one of the input and the output of the uninterruptible power system. In accordance with an aspect of this embodiment, the second contact region of the busbar includes a second plurality of apertures each to receive a respective second fastener that electrically and mechanically couples the second contact region of the busbar to the one of the input and the output of the maintenance bypass panel. In accordance with a further aspect of this embodiment, at least one of the first plurality of apertures and the second plurality of apertures are slots.

In accordance with one embodiment, the busbar is a unitary structure having an elongated U-shape, wherein the measurement access region has a semicircular shape and a reduced surface area relative to the first contact region and the second contact region. In accordance with one embodiment, the cover includes a uninterruptible power system side cover having first mating features configured to removably attach the uninterruptible power system side cover to a first portion of the busbar, a maintenance bypass panel side cover having second mating features configured to removably attach the maintenance bypass panel side cover to a second portion of the busbar, and a measurement access cover having third mating features configured to removably attach the measurement access cover to a third portion of the busbar and in registration with the uninterruptible power system side cover, the maintenance bypass panel side cover, and a surface of the measurement access region of the busbar. In accordance with another embodiment, the cover includes a first cover and a second cover, the first cover configured to shield an outer surface of the busbar and having first mating features configured to removably attach the first cover to the busbar, and the second cover configured to shield an inner surface of the measurement access region of the busbar and having second mating features configured to removably attach the second cover to the measurement access region of the busbar and in registration with the first cover.

In accordance with one embodiment, the busbar is configured to electrically and mechanically couple the input of the uninterruptible power system to the output of the maintenance bypass panel. In accordance with one embodiment, the busbar includes an aperture configured to receive a fastener that removably connects a load-test/burn-in busbar to the busbar, the load-test/burn-in busbar electrically and mechanically coupling the input of the uninterruptible power system to another input of the uninterruptible power system having a same phase.

In accordance with another embodiment, the measurement access region of the busbar has a substantially U-shape, wherein the first contact region and the second contact region are substantially perpendicular to the measurement access region, and wherein the first contact region is substantially perpendicular to the second contact region. In accordance with one embodiment, the cover includes a first cover and a second cover, the first cover configured to shield a bottom and side surfaces of the busbar and having first mating features configured to removably attach the first cover to the busbar, and the second cover configured to shield an upper surface of the busbar and having second mating features configured to removably attach the second cover in registration with the first cover. In one embodiment, the busbar is a unitary structure. In another embodiment, the busbar is a multipart structure that includes a first busbar and a second busbar, the first busbar including the first contact region and a first portion of the measurement access region, and the second busbar including the second contact region and a second portion of the measurement access region, wherein the first portion of the measurement access region is removably fastened to the second portion of the measurement access region. In accordance with an aspect of the present invention, the busbar is configured to electrically and mechanically couple the input of the uninterruptible power system to the output of the maintenance bypass panel, and the busbar includes an aperture configured to receive a fastener that removably connects a cable to the busbar, the cable electrically coupling the input of the uninterruptible power system to another input of the uninterruptible power system having a same phase. In accordance with another aspect of the present invention, the one of the input and the output of the uninterruptible power system can be electrically and mechanically decoupled from the one of the output and the input of the maintenance bypass panel without physically accessing any portion of the maintenance bypass panel.

In accordance with further aspect of the present invention, a busbar for transmitting power between an uninterruptible power system and a maintenance bypass panel is provided. The busbar includes a bar and a cover. The bar is formed from a conductive material and has a uninterruptible power system contact region defined at a first end of the bar and a maintenance bypass panel contact region defined at a second end of the bar that opposes the first end of the bar. The bar includes a measurement access region defined between the uninterruptible power system contact region and the maintenance bypass panel contact region. The uninterruptible power system contact region includes a first plurality of apertures each configured to receive a first respective fastener that electrically and mechanically couples one of an input and an output of the uninterruptible power system to the uninterruptible power system contact region of the bar, and the maintenance bypass panel contact region includes a second plurality of apertures each configured to receive a second respective fastener that electrically and mechanically couples one of an input and an output of the maintenance bypass panel to the maintenance bypass panel contact region of the bar. The cover is formed from an insulating material and configured to be removably attached to the bar and to shield the bar from contact with objects having a diameter greater than approximately four millimeters. The cover includes a measurement aperture having an opening that is approximately four millimeters or less in diameter that is configured to permit access to the measurement access region of the bar.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5F is a perspective view of the UPS/MBP busbar of FIG. 5E showing a third portion of a protective cover in accordance with an embodiment of the present invention;

FIG. 5G is a perspective view of the UPS/MBP busbar and protective cover installed in an MBP in accordance with an embodiment of the present invention;

FIG. 7E is a front perspective view of a UPS/MBP busbar in accordance with another embodiment of the present invention that may be used in a high availability power system;

FIG. 7F is an alternative perspective view of the UPS/MBP busbar of FIG. 7E;

FIG. 7G is a rear perspective view of the UPS/MBP busbar of FIG. 7E;

FIG. 7I is a perspective view of the high availability power system power system of FIG. 7H in which an interface cover of the UPS is removed and showing the manner in which current measurements may be made.

DETAILED DESCRIPTION

Figure 1:
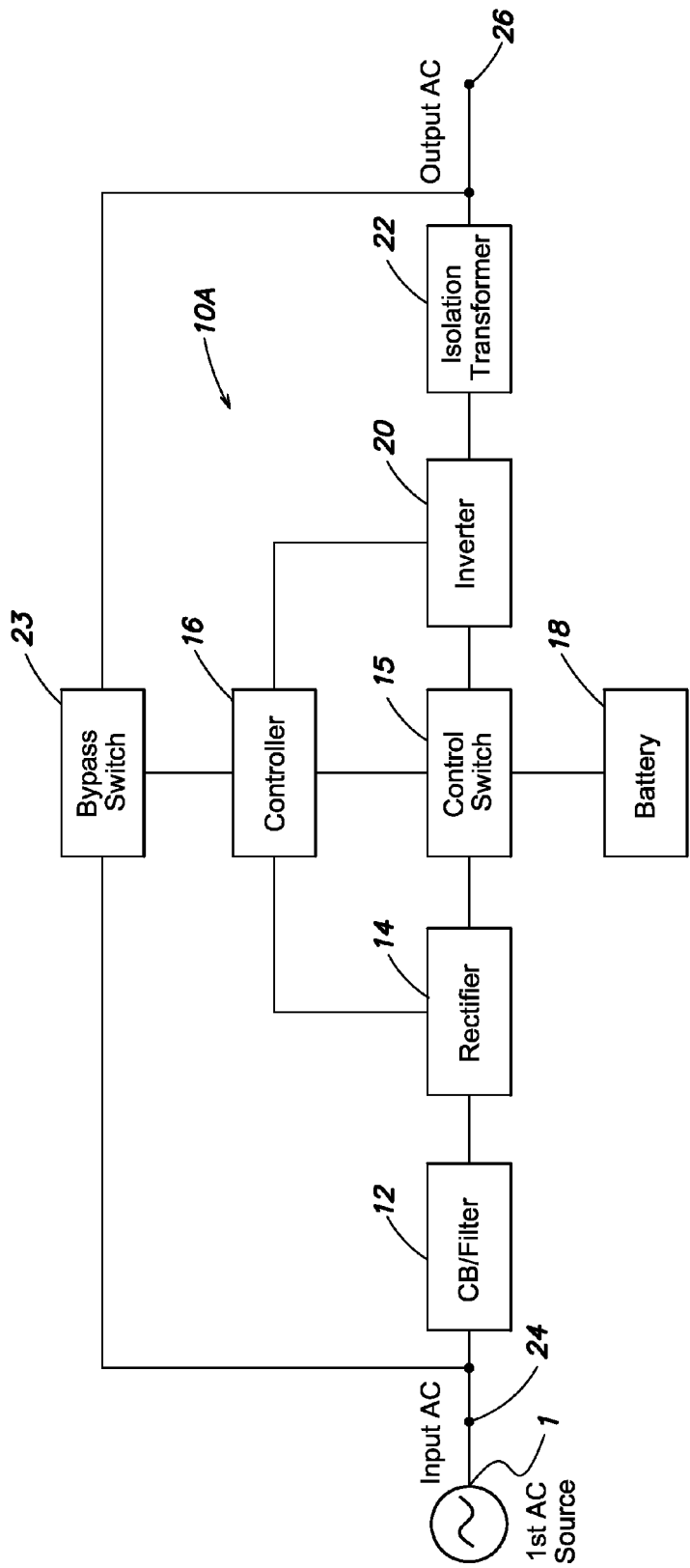
FIG. 1 is a functional block diagram of a first prior art UPS.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Embodiments of the present invention provide cost-effective, high availability power systems. In accordance with one aspect of the present invention, a power system is provided that permits voltages and currents to be measured without exposing a person, such as a service technician, to hazardous voltages and currents typically associated with such power systems. In accordance with another aspect of the present invention, a power system is provided that includes a UPS and a Maintenance Bypass Panel, in which the UPS may be removed, repaired, replaced, and/or burn-in tested or load-tested while still providing power to a load. In accordance with one embodiment, each of these aspects are combined to provide a high availability power system that can be serviced and/or repaired without exposing a service technician to hazardous voltages and currents. These and other aspects and embodiments are now described with respect to FIGS. 3-7 below.

Figure 2:
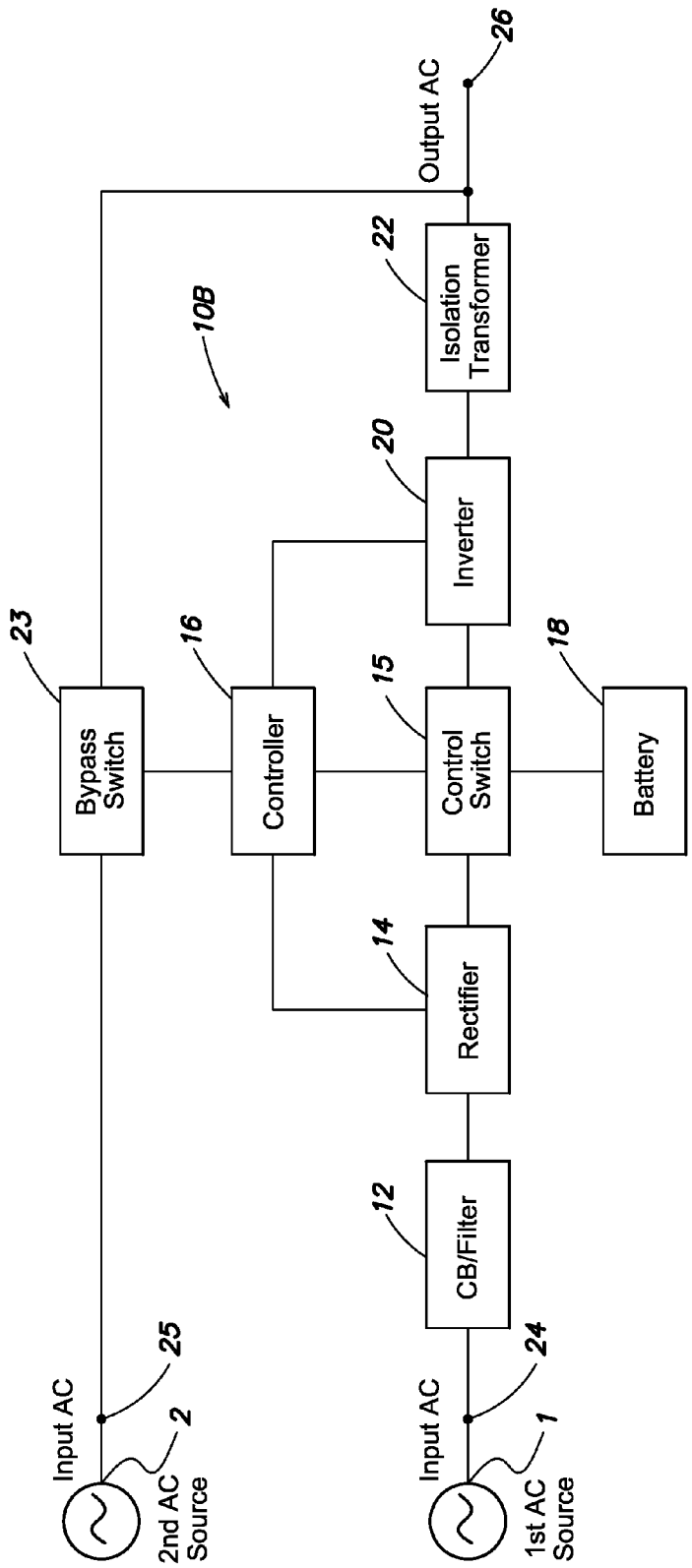
FIG. 2 is a functional block diagram of a second prior art UPS.
Figure 3:
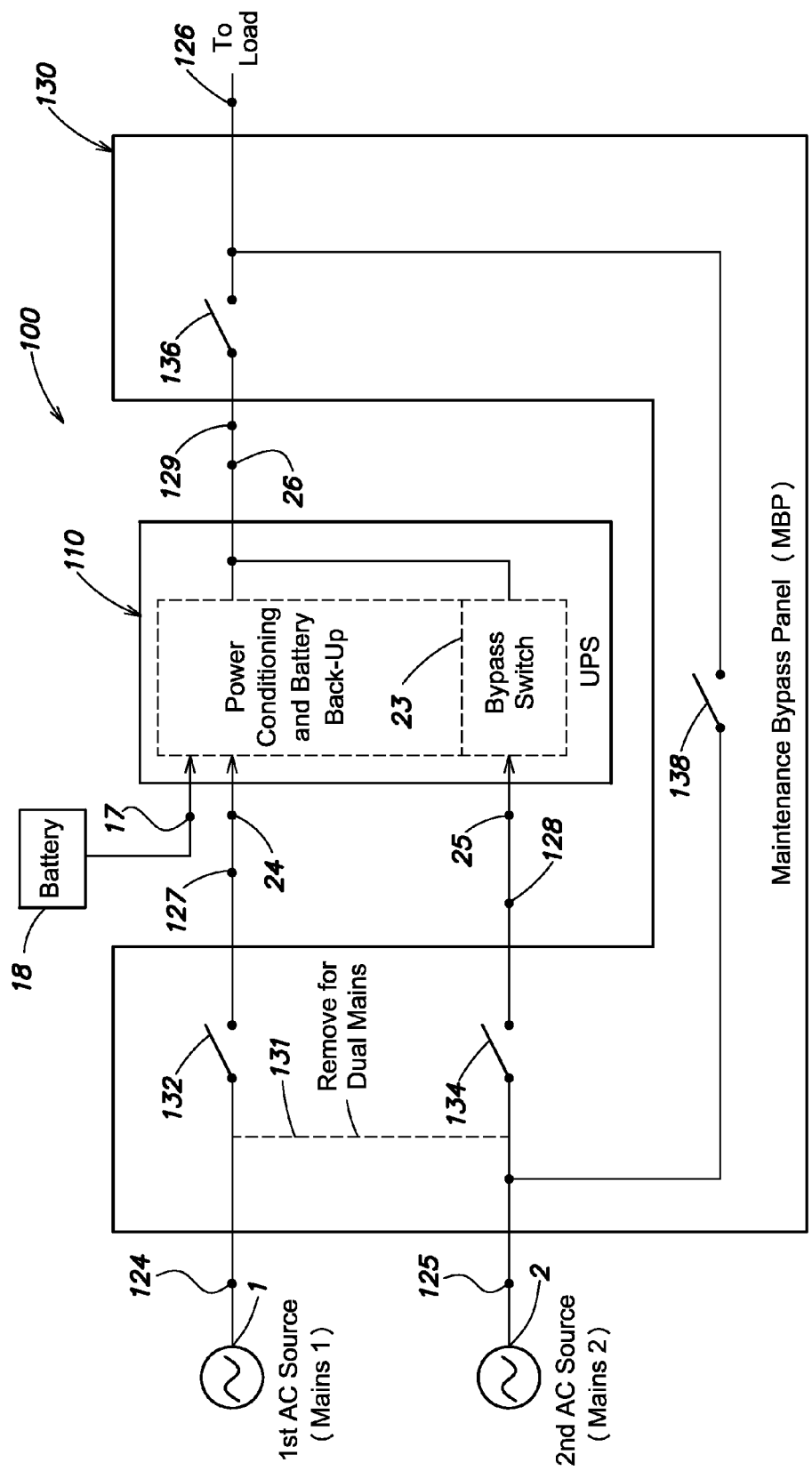
FIG. 3 is a functional block diagram of a high availability power system in accordance with the present invention that includes a UPS and an associated Maintenance Bypass Panel (MBP)

One embodiment of a high availability power system in accordance with the present invention will now be described with reference to FIG. 3, which shows a functional block diagram of a high availability power system 100 that includes a UPS 110 and an associated Maintenance Bypass Panel (MBP) 130. The UPS 110 may be similar in functionality to that described with respect to UPS 10A and 10B of FIGS. 1 and 2 above. As depicted in FIG. 3, the UPS 110 is a dual mains, on-line UPS having a first or primary power input 24 to receive AC power from a first AC power source 1, a DC power input 17 to receive power from a back-up power source, such as a battery 18 (or bank of batteries), a second or bypass power input 25 to receive AC power from a second AC power source 2, and an output 26 to provide power to a load. Although the battery 18 is depicted in FIG. 3 as being external to the UPS 110, it should be appreciated that in other UPS systems, the battery 18 (or bank of batteries) may be disposed within the UPS 110 and form an integral part of the UPS.

Maintenance Bypass Panels, such as MBP 130, are frequently used in larger power systems where it is desired to continue to provide power to a load, even in the event that a UPS that was providing power to the load is to be taken out of service for maintenance, repair, or replacement. As shown in FIG. 3, the MBP 130 includes a plurality of inputs including a first input 124 to be electrically coupled to a first or primary AC power source 1, a second input 125 to be electrically coupled to a second or bypass AC power source 2, and a third input 129 to be electrically coupled to the output 26 of the UPS 110. The MBP 130 also includes a plurality of outputs including a first output 127 to be electrically coupled to the first or primary power input 24 of the UPS 110, a second output 128 to be electrically coupled to the second or bypass power input 25 of the UPS, and a third output 126 to be electrically coupled to a load. Although not depicted in FIG. 3, it should be appreciated that each of the inputs and outputs of the MPB 130 and the UPS 110 will typically include multiple electrical contacts. For example, each of the primary AC power source 1 and the secondary power source 2 may provide two or three-phase power, with each phase being provided on a separate electrical contact (e.g., conductor). Moreover, the DC power input 17 may include multiple contacts to receive, for example, a positive and a negative DC output of the back-up power source or battery 18.

As shown in FIG. 3, the MBP 130 also includes a plurality of switches 132, 134, 136, and 138 for selectively connecting and disconnecting the UPS 110 to the first and second AC power sources and the load. Each of the plurality of switches may include multiple switch elements for respectively connecting and disconnecting a particular phase of power between inputs and outputs of the MBP. As shown, the plurality of switches includes a first switch 132 for respectively connecting and disconnecting the first AC power source 1 to the first or primary power input 24 of the UPS 110, a second switch 134 for respectively connecting and disconnecting the second AC power source 2 to the second or bypass power input 25 of the UPS, a third switch 136 for respectively connecting and disconnecting the output of the UPS to the third (load) output of the MBP, and a fourth switch 138 for respectively connecting and disconnecting the second AC power source 2 directly to the third (load) output of the MBP. Where only a single source of power is available, the MBP 130 may include an interconnect 131 (shown by a dashed line in FIG. 3) for electrically coupling the first input 124 of the MBP to the second input 125 of the MBP.

The high availability power system 100 of FIG. 3 operates in the following manner. During normal operation the switches 132, 134 and 136 are closed and switch 138 is open. Accordingly, the first or primary power input 24 of the UPS 110 is electrically coupled to the first AC power source 1, the second or bypass power input 25 of the UPS is electrically coupled to the second AC power source 2, and the output 26 of the UPS is electrically coupled to the third (load) output of the MBP 130. Power received from the first AC power source 1 on the primary power input 24 of the UPS 110 is conditioned by the UPS and provided to the load via the third (load) output 126 of the MBP 130. Where the power received from the first AC power source 1 is not within predetermined tolerances, such as during "brown out" or "black out" conditions, or due to power surges, the UPS 110 may activate the control switch 15 (FIGS. 1 and 2) to provide DC power received from the back-up power source 18 to the inverter 20 (FIGS. 1 and 2) and then to the load via the third (load) output 126 of the MBP in a manner similar to that described above with respect to FIGS. 1 and 2. Upon a failure condition within the UPS 110, or upon a failure of the first AC power source 1, the bypass switch 23 is activated to bypass the UPS circuitry and directly supply AC power received from the second AC power source 2 to the third (load) output 126 of the MBP in a manner similar to that described with respect to FIG. 2.

Where there is a failure in the UPS 110, the use of the MBP 130 permits the UPS to be electrically disconnected from the first and second AC power sources while still providing power to the load via the second AC power source 2. In this UPS failure mode of operation, switches 132, 134, and 136 are opened, and switch 138 is closed. The opening of switch 132 electrically decouples the first or primary power input 24 of the UPS 110 from the first AC power source 1, the opening of switch 134 electrically decouples the second or bypass power input 25 of the UPS from the secondary power source 2, and the opening of switch 136 electrically decouples the output 26 of the UPS from the third input of the MBP 130. The closing of switch 138 electrically couples the second AC power source 2 directly to the third (load) output 126 of the MBP 130.

In many power systems, the UPS 110 and the MBP 130 are contained in separate housings or cabinets that are electrically connected together via cables. In other power systems, the UPS 110 and the MBP 130 are combined in a single cabinet or housing. Each of these configurations can result in a service technician who is attempting to diagnose, service, repair, or replace a failed or malfunctioning UPS being exposed to hazardous currents or voltages that may be present in the UPS, or in the MBP. For example, in many situations where a UPS is in a failure mode, the service technician may not trust the error messages that may be reported by the UPS. In still other situations, the UPS may be so severely damaged, that failure messages or alerts cannot even be provided. In such circumstances, the service technician will typically check the various voltages and currents going into and coming out of the UPS using a conventional voltmeter and current clamp, such as a Fluke model i410 AC/DC Current Clamp or a Fluke model i200 flex AC Current Clamp, each available from Fluke Corporation of Everett Washington, USA. In most conventional uninterruptible power systems, gaining access to the various cables and/or busbars that electrically connect the UPS and the MBP requires removal of a cover (e.g., a front or back cover, or a top, bottom, or side cover) on the UPS, on the MBP, or both, that is specifically designed to prevent exposure to the hazardous voltages and currents inside. When that cover is opened, the service technician may be exposed to hazardous voltages and/or currents. Certain power systems may even require the use of specialized insulated blankets that are placed in particular locations to prevent accidental contact with hazardous regions of the UPS and/or MBP which are then removed when the work is complete. Accordingly, in many instances, a highly trained service technician, such as a service engineer that is specially trained to service a particular type of power system is needed.

Applicants have appreciated that it would be desirable to provide a high availability power system in which voltages and currents provided to a UPS by the various sources of AC and DC power, and those voltages and currents output by the UPS can be measured by a service technician with only minimal training, with conventional measurement equipment, and without exposing the service technician to hazardous voltages and currents that are typically present during operation of the high availability power system. Applicants have further appreciated that it would be desirable to permit a UPS to be repaired, removed, or replaced while still providing power to a load, and without exposing the service technician to hazardous voltages and currents. A high availability power system that includes a UPS and an MBP that addresses one or more of these concerns is now described more fully below.

Figure 4A:
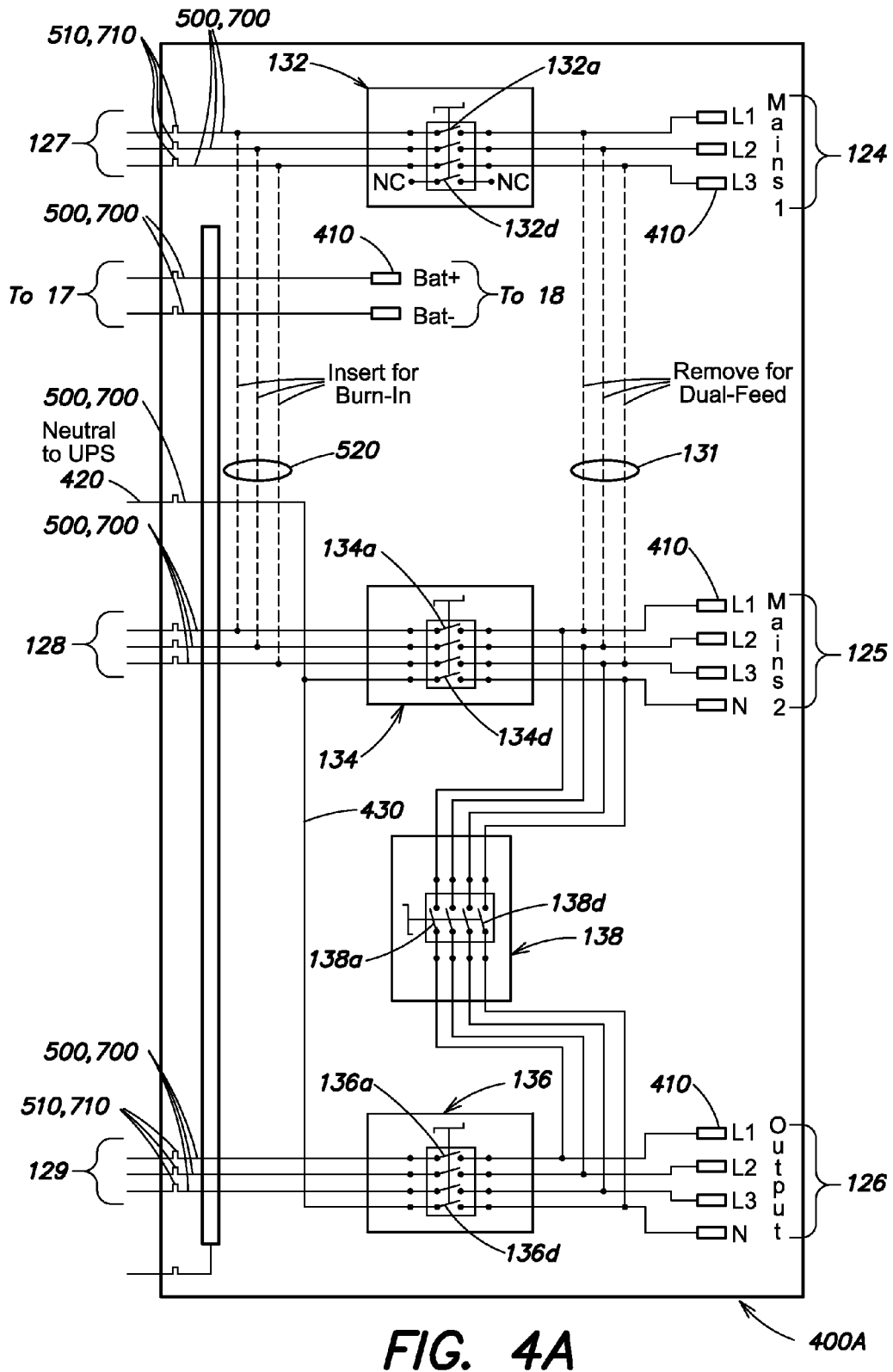
FIG. 4A is an electrical schematic diagram of an MBP in accordance with one embodiment of the present invention for use in a high availability power system.
Figure 4B:
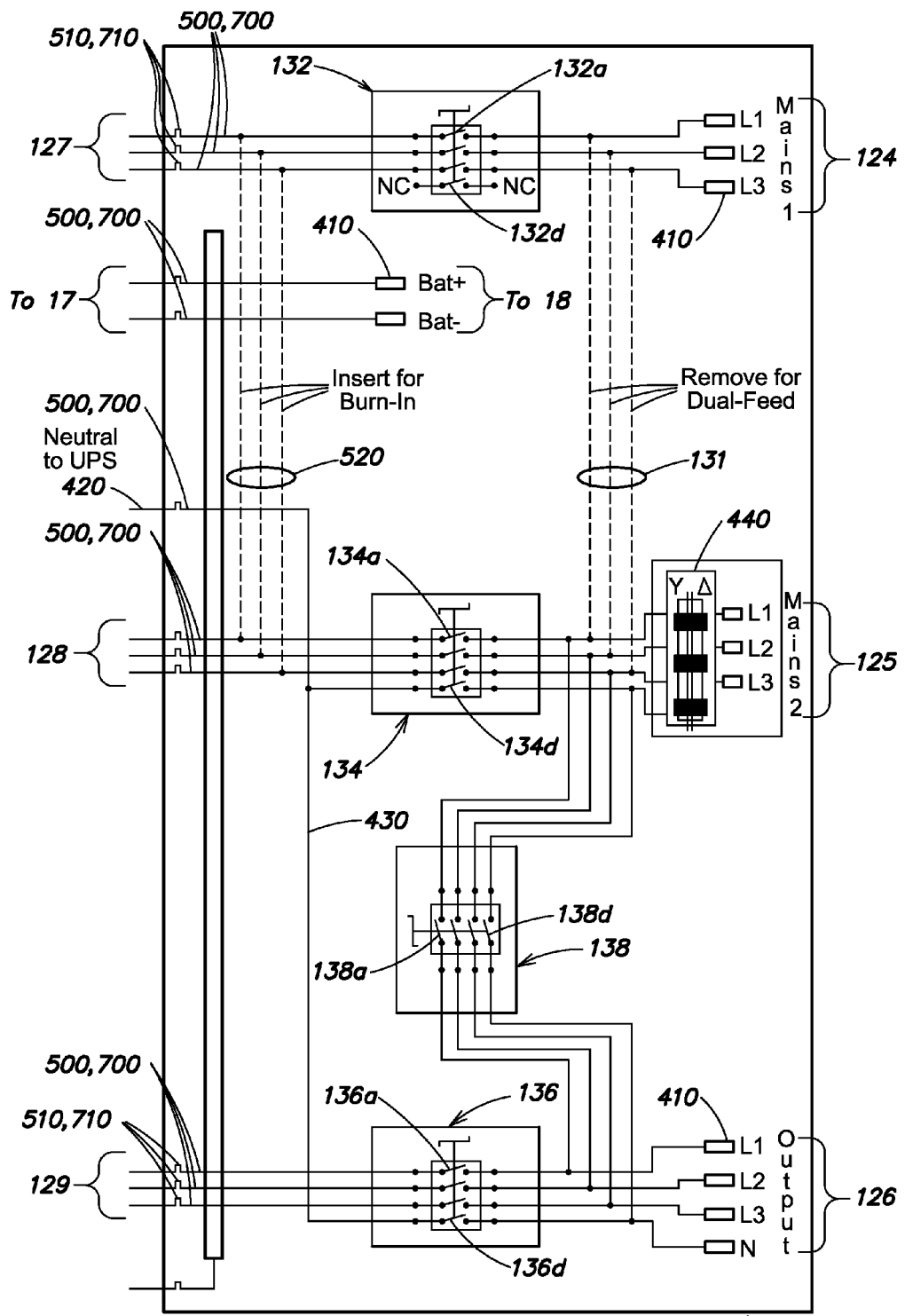
FIG. 4B is an electrical schematic diagram of an MBP that includes an input transformer in accordance with another embodiment of the present invention for use in a high availability power system power system.
Figure 4C:
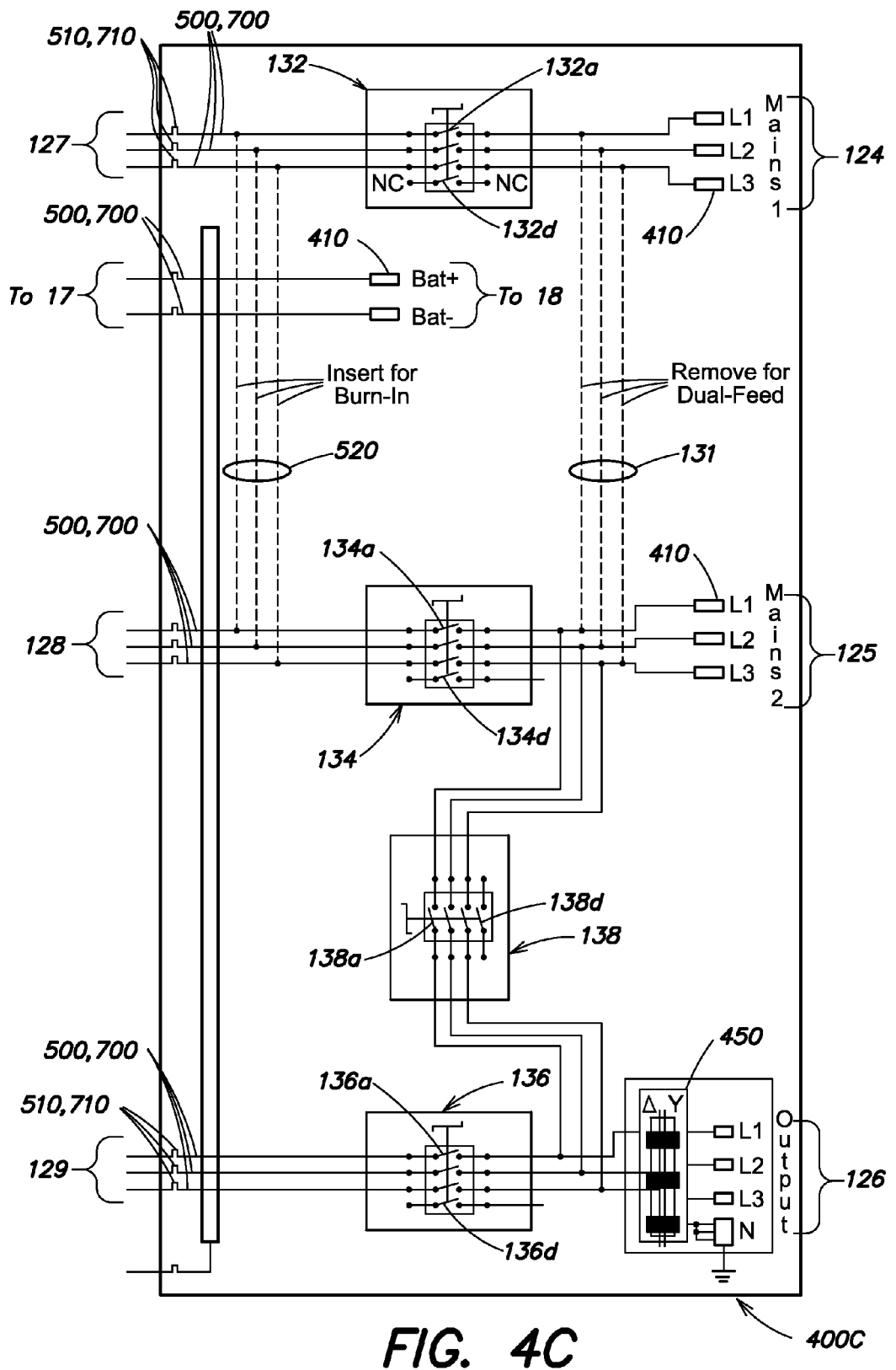
FIG. 4C is an electrical schematic diagram of an MBP that includes an output transformer in accordance with another embodiment of the present invention for use in a high availability power system power system.

FIGS. 4A-4C are electrical schematic diagrams of a Maintenance Bypass Panel 400 for use in a high availability power system in accordance with various embodiments of the present invention, with FIG. 4A illustrating an MBP 400A with no input or output transformer, with FIG. 4B illustrating an MBP 400B with an input transformer, and with FIG. 4C illustrating an MBP 400C with an output transformer. In FIGS. 4A-C, those elements that are in common with FIG. 3 are identified by the same reference numerals.

As shown in the embodiment of FIG. 4A, the MBP 400A includes a first or primary input 124 for electrically coupling to a first AC power source (mains1), a second input 125 for electrically coupling to a second AC power source (mains2), and a third input 129 for electrically coupling to an output 26 (FIG. 3) of a UPS 110. The first input 124 and the second input 125 each includes a plurality of terminal blocks 410 to be electrically connected to a respective conductor (or lead, "L") carrying a respective phase of power. In the embodiment depicted, each of the AC power sources provides three-phase power (e.g., three leads identified as leads L1, L2, L3), and thus there are three terminal blocks 410 for each input. The second input 125 further includes an additional terminal block 410 for receiving a neutral conductor or lead (N). The neutral conductor provided at the second input 125 by the second power source is shared in common with the UPS and also provided to the load. It should be appreciated that in other embodiments, the number of phases of electrical power may vary from that shown (e.g., single-phase power, two-phase power, three-phase power, or four-phase power), and each of the inputs may receive a neutral conductor or lead that is electrically connected in common. Alternatively, in other embodiments, the neutral conductor may be provided by the first AC power source and received at the first input 124 and shared in common amongst the UPS and the load (although a different configuration of switches would be used to provide that neutral conductor to the load).

The third input 129 of the MBP 400A includes a plurality of UPS/MBP busbars 500, 700 (described in detail further below with respect to FIGS. 5 and 7) for electrically and mechanically coupling to the output 26 (FIG. 3) of the UPS 110. As described in detail further below with respect to FIGS. 5 and 7, each of the UPS/MBP busbars 500, 700 includes a measurement access region 510, 710 at which voltage and current measurements may be made, without exposing the person making the measurements to those hazardous voltages and currents. In the embodiment illustrated in FIG. 4A, the third input 129 of the MBP includes three UPS/MBP busbars 500, 700, one for each of the phases of power provided by the UPS.

MBP 400A also includes a first output 127 for electrically coupling to the first or primary power input 24 (FIG. 3) of the UPS 110, a second output 128 for electrically coupling to the second or bypass input 25 (FIG. 3) of the UPS, and a third or load output 126 for electrically coupling to a load (not shown). Each of the first and second outputs 127, 128 of the MBP 400A includes a plurality of UPS/MBP busbars 500, 700 for electrically and mechanically coupling to the first and second inputs of the UPS that are similar to those of the previously described third input 129. The third output 126 of the MBP 400A includes a plurality of terminal blocks 410 for electrically coupling each phase of power and neutral to the load. MBP 400A also includes one or more terminal blocks 410 for electrically coupling an external back-up power source, such as a battery 18 (FIG. 3) or bank of batteries to the MBP 400A, and one or more UPS/MBP busbars 500, 700 for electrically and mechanically coupling the back-up power source to the DC power input 17 (FIG. 3) of the UPS. In the embodiment illustrated in FIG. 4A, two terminal blocks and two UPS/MBP busbars 500, 700 are provided for electrically and mechanically coupling a respective output (e.g., Battery + and Battery −) of the back-up power source or battery 18 to the DC power input 17 of the UPS, although more or fewer terminal blocks and UPS/MBP busbars may be provided, depending upon the input requirements of the UPS and the outputs provided by the back-up power source. MBP 400A also includes a UPS/MBP busbar 500, 700 (designated by reference number 420 for clarity) for electrically coupling the neutral conductor with the UPS 110. As shown, the neutral conductor is connected in common with the UPS 110, the second AC power source 2, and the load via an MBP busbar 430 within the MBP 400A.

MBP 400A further includes a plurality of switches 132, 134, 136, and 138 for selectively connecting and disconnecting the UPS 110 to the first and second AC power sources and the load. As shown, each of the plurality of switches may include multiple switch elements (designated a-d) for respectively connecting and disconnecting a particular phase of power (or neutral) between inputs and outputs of the MBP. For example, the first switch 132 includes three switch elements 132a-132c for respectively connecting and disconnecting each of the three phases of power provided by the first AC power source to the first output of the MBP 400A (in the embodiment depicted in FIG. 4A, the fourth switch element 132d is not used), the second switch 134 includes four switch elements 134a-134d for respectively connecting and disconnecting each of the three phases of power and neutral provided by the second AC power source to the second output 128 of the MBP, the third switch 136 includes three switch elements 136a-136c for respectively connecting and disconnecting each of the three phases of power provided by the UPS to the third or load output 126 of the MBP, as well as a fourth switch element 136d for respectively connecting and disconnecting the neutral MBP busbar 430 to the third or load output 126 of the MBP, and the fourth switch 138 includes four switch elements 138a-138d for respectively connecting and disconnecting each of the phases of power and neutral provided by the second AC power source directly to the third or load output 126 of the MBP. In operation, each of the switch elements (e.g., 132a-d) of a respective switch is operated in tandem with the others. For example, opening the switch 132 opens each of the switch elements 132a-132d substantially simultaneously, and closing the switch 132 closes each of the switch elements 132a-132d substantially simultaneously.

Although not shown in FIG. 4A, each of the switch elements 136a-d and 138a-d of switches 136 and 138 may include circuit breakers as well as switch elements to comply with certain safety standards of a particular country or region. Moreover, each of switches 136 and 138 may include further safeguards to prevent accidental damage to the UPS 110, the MBP 400A, or harm to service technicians or other personnel. For example, each of switches 136 and 138 may incorporate a Solenoid Key Release Unit (SKRU) or other type of mechanical or electromechanical lock-out mechanism to prevent the fourth switch 138 from being closed while the third switch 136 is in a closed position, and to prevent the third switch 136 from being closed while the fourth switch 138 is in a closed position. One such type of lock-out mechanism that may be used with the embodiment of FIG. 4A (as well as the embodiments of FIGS. 4B and 4C) and which is specifically adapted for use with uninterruptible power systems and maintenance bypass panels is available from Kirk Key Interlock Company of Massillon, Ohio and referenced as Scheme 39.

For use with only a single AC power source, the MBP 400A may also include an interconnect 131 (shown in dotted line form) for connecting the first input 124 to the second input 125. In addition, as discussed in detail further below, the MBP 400A may also include load-test/burn-in busbars 520 that may be used to load test and/or burn-in test a UPS while still providing power to a load from the second AC power source. In accordance with an aspect of the present invention, each of the load-test/burn-in busbars 520 may be identical to busbars used in interconnect 131, such that when used in a dual mains configuration, the busbars of interconnect 131 may be removed and re-installed as the load-test/burn-in busbars 520.

FIG. 4B illustrates an alternative embodiment of an MBP in accordance with the present invention that is similar to the MBP 400A of FIG. 4A. However, in contrast to the MBP 400A of FIG. 4A, the MBP 400B includes an input transformer 440 electrically coupled between the second switch 134 and the second input 125 of the MBP 400B. The input transformer 440 may be used to provide isolation between the load and the second AC power source and/or to increase or decrease the voltage of the AC power received from the second AC power source. As other aspects of the MBP 400B are similar to those described previously with respect to MBP 400A of FIG. 4A, further discussion of those common aspects is omitted herein.

FIG. 4C illustrates an alternative embodiment of an MBP in accordance with the present invention that is similar to the MBP 400A of FIG. 4A. However, in contrast to the MBP 400A of FIG. 4A, the MBP 400C includes an output transformer 450 electrically coupled between the third switch 136 and the third or load output 126 of the MBP 400C. The output transformer 450 may be used to provide isolation between the load and the second AC power source and/or to increase or decrease the voltage of the AC power received from the second AC power source. The output transformer 450 may also be used to provide isolation between the load and the UPS 110, and/or to increase or decrease the voltage of the AC power provided by the UPS. The use of the output transformer 450 may thus avoid the need for a separate isolation transformer in the UPS (i.e., isolation transformer 22 in FIGS. 1 and 2) while providing isolation and/or voltage conversion between the load and each of the UPS and the second AC power source. Another difference between the MBP 400C and MBP 400A and 400B is that MBP 400C does not include a UPS/MBP busbar 420 for electrically coupling a neutral conductor to the UPS 110. As other aspects of the MBP 400C are similar to those described previously with respect to MBP 400A of FIG. 4A, further discussion of those common aspects is omitted herein.

FIGS. 5A-5I illustrate a first embodiment of a UPS/MBP busbar that may be used in a high availability power system that includes a UPS and a maintenance bypass panel in accordance with an aspect of the present invention. As shown, the UPS/MBP busbar 500 of this embodiment is a unitary structure formed of a conductive material, such as aluminum or copper, although other conductive materials may be used. The UPS/MBP busbar 500 has an elongated U-shape with the ends of the U-shaped UPS/MBP busbar 500 defining a UPS contact region 530 and an MBP contact region 540. Between the UPS contact region 530 and the MBP contact region 540 is a semicircular measurement access region 510 that is configured to permit the measurement of currents and voltages using conventional current/voltage meters, as discussed further below. The elongated U-shape of the UPS/MBP busbar 500 allows it to absorb minor differences in position between the UPS and the MBP, as it can flex in two directions (e.g., in the X and Y directions illustrated in FIG. 5B).

Figure 5A:
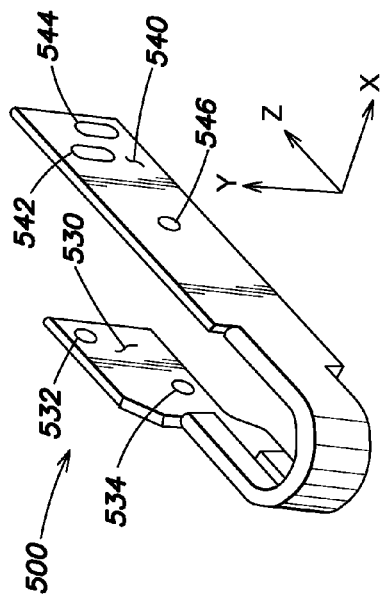
FIG. 5A is a perspective view of a UPS/MBP busbar in accordance with an embodiment of the present invention that may be used in an high availability power system.
Figure 5B:
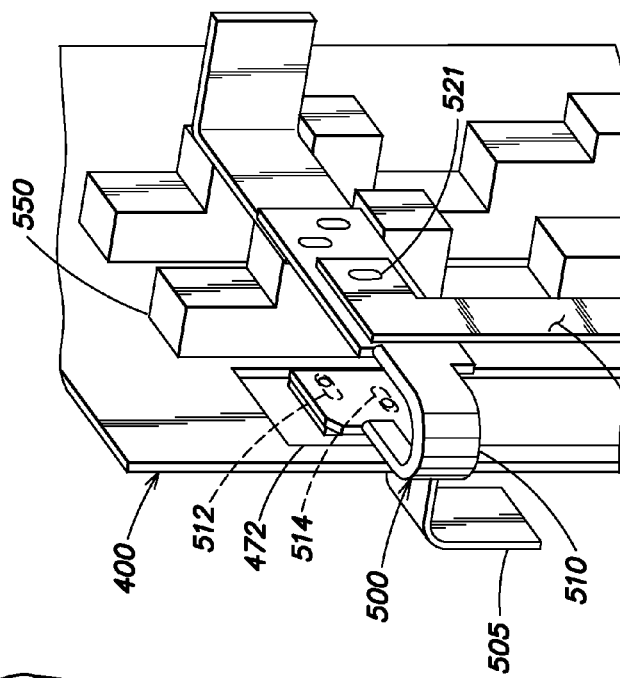
FIG. 5B is an alternative perspective view of the UPS/MBP busbar of FIG. 5A.
Figure 5C:
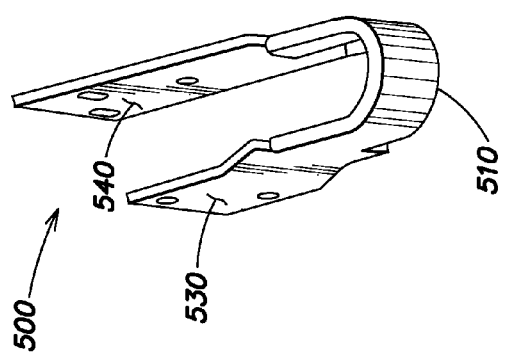
FIG. 5C is a perspective view of the UPS/MBP busbar of FIGS. 5A and 5B installed in an MBP in accordance with an embodiment of the present invention.
Figure 5E:
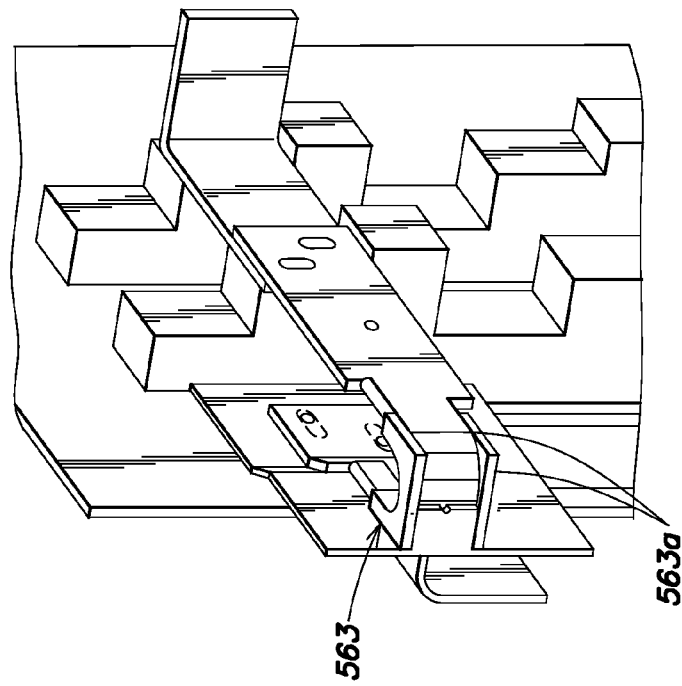
FIG. 5E is an enlarged perspective view of the UPS/MBP busbar of FIG. 5D showing a second portion of a protective cover in accordance with an embodiment of the present invention.
Figure 5D:
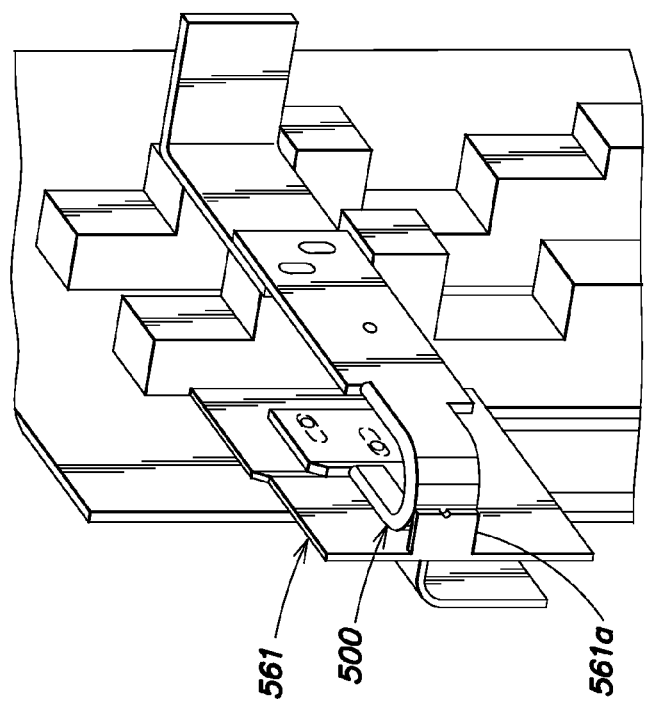
FIG. 5D is a perspective view of the UPS/MBP busbar of FIGS. 5A and 5B showing a portion of a protective cover in accordance with an embodiment of the present invention.

Each of the UPS contact region 530 and the MBP contact region 540 has an increased surface area (relative to the rest of the structure) to ensure a low resistance connection with inputs or outputs of the UPS, or with other busbars in the MBP. As shown, the UPS contact region 530 includes a plurality of apertures 532, 534 each to receive a fastener, such as a threaded bolt (not shown). In one implementation, captivated nuts (not shown) are attached (e.g., by press-fit or by welding) to an inside surface UPS/MBP busbar 500 adjacent each of the apertures 532, 534 so that electrical and mechanical connection of an input or output contact 505 (see FIG. 5C) of the UPS to the UPS/MBP busbar 500, and electrical and mechanical disconnection of an input or output contact 505 of the UPS from the UPS/MBP busbar 500 may be made with access only from the UPS side. As shown in dotted line form in FIG. 5C, each of the contacts 505 of an input or output 17, 24, 25, or 26 (FIG. 3) of the UPS 110 may include a plurality of apertures 512, 514, each to receive a threaded bolt that electrically and mechanically couples the contact 505 to the UPS contact region 530 of the UPS/MBP busbar 500. As shown in FIG. 5C, each of the apertures 512, 514 may be formed as slots to tolerate some amount of misalignment in a particular direction (e.g., in the Z direction as shown).

The MBP contact region 540 also includes a plurality of apertures 542, 544 each to receive a fastener, such as a threaded bolt (not shown) to electrically and mechanically couple the UPS/MBP busbar 500 to an MBP busbar 550 (FIG. 5C) internal to the MBP. The MBP busbar 550 may include a plurality of internally threaded apertures to receive each of the threaded bolts. Each of the apertures 542, 544 may be formed as slots to tolerate some amount of misalignment in a particular direction (e.g., in the Y direction as shown). The MBP contact region 540 further includes at least one additional aperture 546 that is adapted to receive a threaded bolt (not shown) to couple a load-test/burn-in busbar 520 (FIG. 5C) to the UPS/MBP busbar 500. In one implementation, a captivated nut (not shown) is attached (e.g., by press-fit or by welding) to an inside surface of the UPS/MBP busbar 500 adjacent the at least one aperture 546 to permit the load-test/burn-in busbar 520 to be attached by simply inserting and tightening the bolt. The load-test/burn-in busbar 520 may include at least one aperture 521 to receive a threaded bolt (not shown) and electrically and mechanically couple the load-test/burn-in busbar 520 to the UPS/MBP busbar 500. The at least one aperture 521 may again be formed in the shape of a slot (e.g., a vertical slot, a horizontal slot, or an interconnected pair of orthogonal slots) to tolerate some amount of misalignment. Although not visible in FIG. 5C, in one embodiment, the load-test/burn-in busbar 520 has a rectilinear C-shape, so that it may be used in either one of two orientations. In other embodiments, rather than using a load-test/burn-in busbar 520, an insulated cable may be used as described with respect to FIGS. 7A-J further below. It should be appreciated that the elongated U-shape of the UPS/MBP busbar 500 and the use of slots formed in different directions permits the UPS/MBP busbar to tolerate some amount of misalignment in position between the UPS and the MBP in each of three orthogonal directions (e.g., the X, Y, and Z directions as shown).

As shown in FIGS. 5D-5I, and in accordance with an aspect of the present invention, the UPS/MBP busbar 500 may include a protective cover 560 to prevent exposure to hazardous currents or voltages carried by the UPS/MBP busbar 500 while still permitting service personnel to measure voltages and/or currents carried by the UPS/MBP busbar 500 during operation of the UPS and MBP. In accordance with one embodiment, the protective cover 560 is formed from an electrically insulating material, such as plastic, although other insulating materials may alternatively be used. In accordance with one embodiment, the protective cover 560 includes a UPS side cover 561, an MBP side cover 562, and a measurement access cover 563. The UPS side cover 561 and the MBP side cover 562 are disposed in registration with an outer surface of the UPS/MBP busbar 500, and the measurement access cover 563 is disposed in registration with an inner surface of the UPS/MBP busbar. Each of the UPS side cover 561, the MBP side cover 562, and the measurement access cover 563 may be formed with mating features 561a, 562a, 563a to permit the respective covers to be removably attached to the UPS/MBP busbar 500 and form an interlocking assembly. Although not shown, each of the UPS side cover 561 and the MBP side cover 562 may include additional mating features (e.g., ribs to engage upper and lower surfaces of the UPS/MBP busbar) to releasably secure the side covers 561 and 562 to the UPS/MBP busbar 500.

Figure 5I:
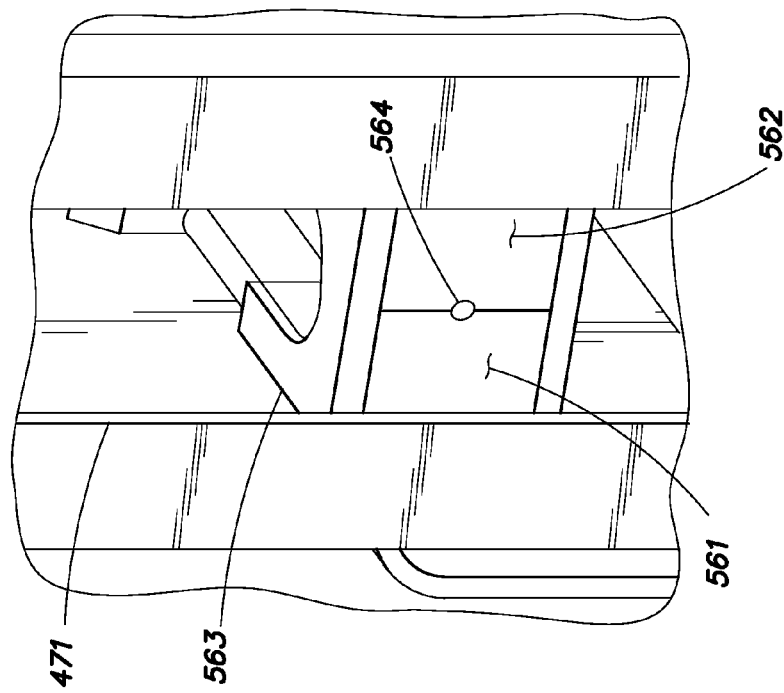
FIG. 5I is an enlarged perspective view of FIG. 5H showing a measurement access region of the UPS/MBP busbar.

As best shown in FIG. 5I, each of the UPS side cover 561 and the MBP side cover 562 may include a notch or cut-out that, when placed in registration with the UPS/MBP busbar 500, forms a measurement aperture 564. In accordance with aspect of the present invention, the measurement aperture 564 is dimensioned to permit a voltage probe to be inserted into the measurement aperture 564 and to electrically contact the UPS/MBP busbar 500, thereby enabling voltage measurements while the protective cover 560 is in place. In one embodiment, the measurement aperture 564 has a diameter of approximately 4 mm and is dimensioned to comply with International Protection Rating Code (sometimes alternatively referred to as IP Code or Ingress Protection Rating Code) Code 2X (IP2X), although some embodiments may include a smaller measurement aperture to comply with IP Code 3X (IP3X). Such a small diameter permits measurement tools, such as the voltage probe of a voltmeter or current clamp to be inserted into the measurement aperture 564, while preventing the ingress of larger objects, such as a finger. Although the measurement aperture 564 is shown as having a circular shape, it should be appreciated that the present invention is not so limited, as other shapes for the measurement aperture 564 may be used.

Although the protective cover 560 is shown as being formed by three distinct covers 561, 562, and 563, it should be appreciated that other alternative configurations may be used. For example, the UPS side cover 561 and the MBP side cover 562 may be molded as an integral assembly and slid into place about the UPS/MBP busbar 500 and in registration with the measurement access cover 563, or alternatively, to be slid into place about the UPS/MBP busbar 500 without the use of the measurement access cover 563.

Figure 5H:
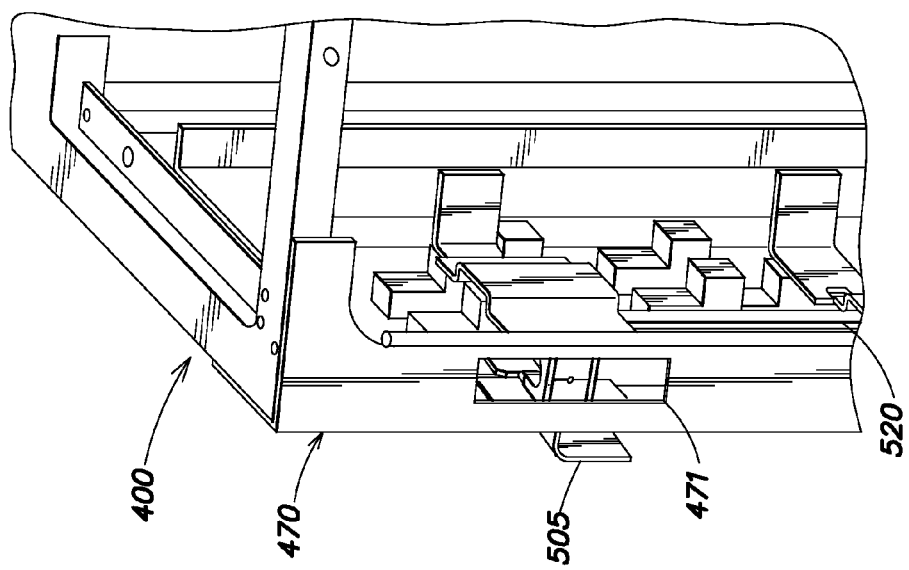
FIG. 5H is a perspective view of an MBP that includes a UPS/MBP busbar and protective cover in accordance with an embodiment of the present invention.

FIGS. 5G and 5H illustrate different views of a UPB/MBP busbar 500 together with the protective cover 560 that may be used with a high availability power system that includes a UPS and an MBP in accordance with an embodiment of the present invention. As shown in FIG. 5H, a frame of an MBP 400, such as MBP 400A, 400B, and 400C of FIGS. 4A-4C may include a front cover 470 having a measurement access window 471 through which a voltage probe or a current clamp may be inserted to measure voltages and/or currents during operation of the UPS and or MBP of the high availability power system 100. The size of the window 471 may be dimensioned to permit the jaws of a Hall effect current clamp, such as a Fluke i410 AC/DC current clamp, or the sensing coil of a Rogowski coil current clamp, such as a Fluke i2000 Flex AC current clamp, to be inserted around the UPS/MBP busbar 500. The measurement access window 471 may further include a cover (not shown) to further protect against accidental contact. In accordance with one embodiment, a distance between the measurement access window 471 and the UPS/MBP busbar 500 is approximately 6.4 mm or more to comply with various IPR Codes, and may be increased where higher voltage and/or currents may be present. As shown in FIG. 5H (and also in FIG. 5C), the contact 505 of an input or output 17, 24, 25, and 26 of the UPS extends though a contact window 472 (FIG. 5C) formed in a side cover of the MBP 400. Although not shown, the frame of the MBP would typically include a measurement access window 471 and contact window 472 corresponding to each UPS/MBP busbar 500 used by the system to permit the currents and/or voltages carried by each UPS/MBP busbar 500 to be measured. For example, in the MBP 400 described previously with respect to FIGS. 4A and 4B, there are twelve such busbars 500 used to interconnect the UPS to the MBP, (three busbars for each phase of power provided to input 24 of the UPS from Mains1, three busbars for each phase of power provided to the input 25 of the UPS from Mains2, three busbars for each phase of power provided to the output 26 of the UPS, two busbars for each battery voltage provided to the DC power input 17 of the UPS, and one busbar to provide a neutral conductor to the UPS), and thus the MBP may include twelve such windows 471, 472. The embodiment of FIG. 4C may include 11 such busbars 500, as the busbar 420 for the neutral conductor may be omitted.

Figure 6A:
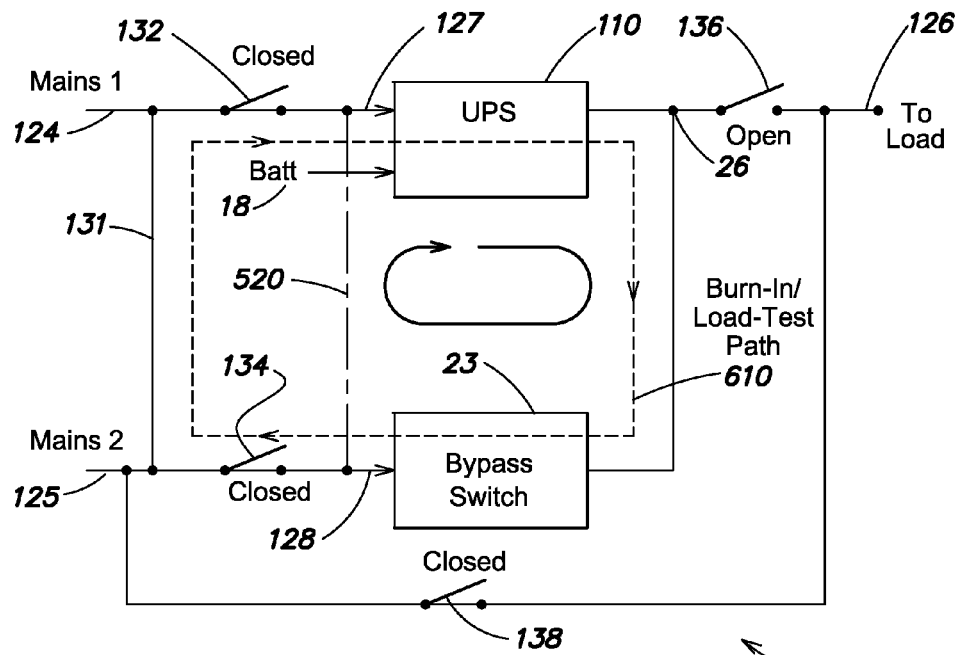
FIG. 6A is a functional block diagram illustrating the manner in which load testing/burn-in testing may be performed in a single mains high availability power system in accordance with an embodiment of the present invention.
Figure 6B:
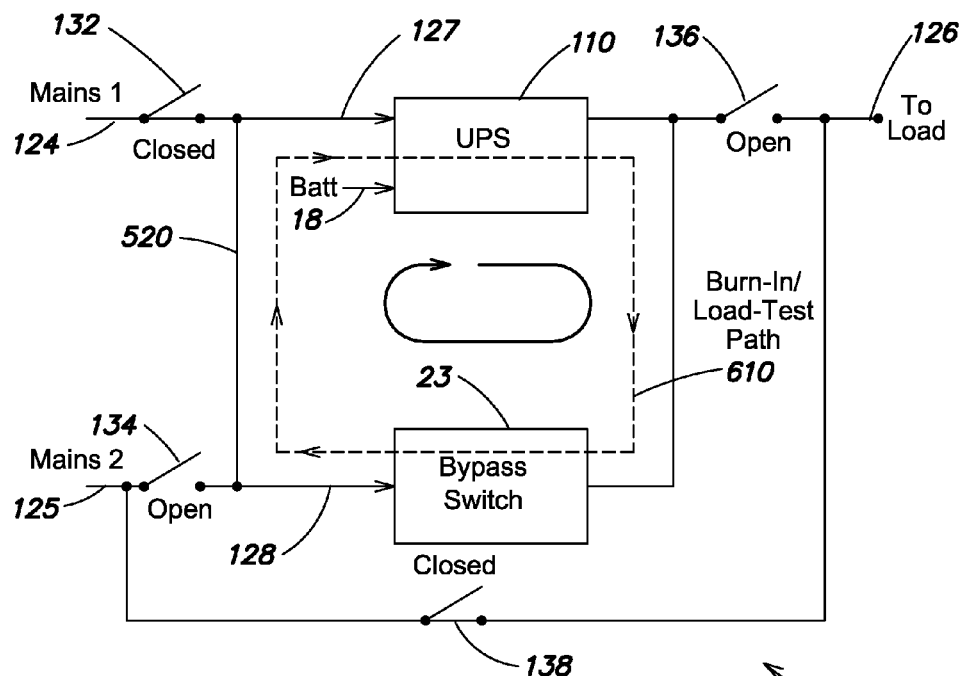
FIG. 6B is a functional block diagram illustrating the manner in which load testing/burn-in testing may be performed in a dual mains high availability power system in accordance with an embodiment of the present invention.

FIGS. 6A and 6B illustrate the manner in which a UPS of a high availability power system that includes a UPS and an MBP may be burn-in tested or load tested in accordance with an aspect of the present invention. More specifically, FIG. 6A illustrates the manner in which a high availability power system 600A that is configured in a single mains configuration may be burn-in tested or load tested while supplying power to a load from a single AC power source, and FIG. 6B illustrates the manner in which a high availability power system 600B that is configured in a dual mains configuration may be burn-in tested or load tested while supplying power to a load from a second of two AC power sources. As depicted in FIGS. 6A and 6B, the high availability power systems 600A and 600B may include a MBP 400, such as MBP 400A, 400B, or 400C described above with respect to FIGS. 4A-C that is electrically and mechanically coupled to a UPS 110 by a plurality of UPS/MBP busbars 500, such as described above with respect to FIGS. 5A-I. In accordance with an aspect of the present invention, the burn-in testing or load testing of the UPS 110 may be performed while the UPS is electrically and mechanically coupled to the MBP 400.

As shown in FIG. 6A, in a single mains configuration, an AC power source may be connected to either of inputs 124 or 125. Inputs 124 and 125 are connected to one another by either interconnect 131, or by load-test/burn-in busbars 520 (shown in dotted and dashed line form in FIG. 6A). As discussed above, the load-test/burn-in busbars 520 may be identical to the busbars used in interconnect 131 (see FIGS. 4A-4C), such that in one embodiment configured in a single mains configuration, they may simply be left in place as interconnect 131 during installation of the power system 600A, or alternatively, the busbars may be shifted to the position identified as "Insert for burn-in" shown in FIGS. 4A-4C. Referring back to FIGS. 4A-4C, when left in place as interconnect 131, inputs 124 and 125 of the MBP 400 are interconnected on the MBP side of switches 132 and 134, and when used as load-test/burn-in busbars 520, inputs 127 and 128 of the UPS 110 are interconnected on the UPS side of switches 132 and 134. To perform load testing or burn-in testing of the UPS 110 in the single mains configuration shown in FIG. 6A, switches 132, 134, and 138 are closed and switch 136 is open. As a result, AC power provided to the output 26 of the UPS 110 is looped back through the bypass switch 23, flows through the interconnect 131 or the load-test/burn-in busbars 520 and back into the input 127 of the UPS 110 along burn-in/load-test path 610, as shown in dashed line form in FIG. 6A. Voltages and currents of the UPS 110 may be measured during load-test/burn-in by accessing the measurement region 510 of a UPS/MBP busbar 500 (FIGS. 5A-5I), for example, by inserting a voltage measurement probe into measurement aperture 564, or by placing the jaws of a current clamp (see current clamp 800 shown in FIG. 7J) about measurement access region 510. In accordance with an aspect of the present invention, these voltage and current measurements may be made without exposing the person making those measurements to direct contact with the UPS/MBP busbars 500 carrying those voltages and currents. Moreover, as load testing/burn-in testing of the UPS 110 is being conducted, AC power continues to be provided to the load by virtue of switch 138 being closed.

In accordance with an aspect of the present invention, during burn-in/load testing of the UPS 110, should it be determined that the UPS is faulty and needs to be repaired or serviced, or should it be determined that the UPS is to be replaced, the UPS 110 may be electrically and mechanically decoupled from the MBP 400, with access from only the UPS side. For example, with reference back to FIGS. 5A-5C, a service technician can power down the UPS and remove the threaded bolts (that are inserted in apertures 532 and 534) that electrically and mechanically couple each contact 505 of the UPS to the UPS/MBP busbar 500 to separate the UPS from the MBP for service, repair, or replacement. Upon service, repair or replacement of the UPS, these threaded bolts may be re-inserted and tightened, and the UPS load tested or burn-in tested to ensure proper operation prior to reconnecting the UPS to the load by opening switch 138 and closing switch 136. It should be appreciated that when the UPS (or a replacement UPS) is returned to service, it may not even be necessary to check whether the connection between each UPS/MBP busbar 500 and the MBP 400 is secure (i.e., via the bolts inserted into apertures 542 and 544), as this connection need not be broken to service, repair or replace the UPS. Moreover, it should further be appreciated that to perform burn-in/load testing in a single mains configuration, the installation and/or removal of the load-test/burn-in busbar 520 (via a threaded bolt inserted through the aperture 521), and the burn-in/load testing of the UPS may be performed without loosening or tightening any of the bolts that electrically and mechanically couple the UPS/MBP busbar 500 to either the UPS or the MBP. In a single mains configuration, where the load-test/burn-in busbars 520 are left in place as interconnect 131, the burn-in load testing of the UPS may be performed without loosening or tightening any bolts attached to the UPS/MBP busbar 500 simply by moving switches 132, 134, and 138 to a closed position and opening switch 136.

FIG. 6B illustrates the manner in which burn-in testing or load testing may be performed in a high availability power system that includes a UPS 110 and an MBP 400 while supplying power to a load, wherein the power system 600B is configured in a dual mains configuration. As shown in FIG. 6B, a first AC power source (Mains1) is coupled to the first input 124 of the MBP and a second AC power source (Mains2) is coupled to the second input 125 of the MBP. In such a dual mains configuration, the interconnect 131 would typically be removed during installation of the power system 600B. The busbars of the interconnect 131 may be retained for use during load/burn-in testing of the UPS, as described further below. To perform service, repair or replacement of the UPS, switches 132, 134, and 136 would be opened, and switch 138 closed so that AC power may be provided to the load via Mains2, while the UPS is electrically isolated from Mains1, Mains2, and the load. The UPS would typically then be powered down. With the UPS is a powered down state, the MBP side cover 562 would be removed, the load-test/burn-in busbars 520 from interconnect 131 would be inserted (as depicted in FIG. 5C) to electrically couple the first input 127 of the UPS to the second input 128 of the UPS, and the MBP side cover 562 replaced. To perform load testing or burn-in of the UPS 110 in the dual mains configuration shown in FIG. 6B, switch 132 would be closed, with switches 134 and 136 being maintained in an open position and with switch 138 being maintained in a closed position to continue providing AC power to the load via Mains2. In this state, the UPS would be powered on to perform burn-in/load testing of the UPS. As a result, AC power provided to the output 26 of the UPS 110 is looped back through the bypass switch 23, flows through the load-test/burn-in busbars 520 and back into the input 127 of the UPS 110 along burn-in/load-test path 610, as shown in dashed line form in FIG. 6B. Voltages and currents of the UPS 110 may again be measured during load/burn-in testing by accessing the measurement region 510 of a UPS/MBP busbar 500 (FIGS. 5A-5I), for example, by inserting a voltage measurement probe into measurement aperture 564, or by placing the jaws of a current clamp (see current clamp 800 shown in FIG. 7J) about measurement access region 510. In accordance with an aspect of the present invention, these voltage and current measurements may be made without exposing the person making those measurements to direct contact with any of the UPS/MBP busbars 500 carrying those voltages and currents as direct contact with the UPS/MBP busbars 500 is prevented by protective cover 560. Moreover, as load testing or burn-in testing of the UPS 110 is being conducted, AC power continues to be provided to the load by virtue of switch 138 being closed.

In accordance with an aspect of the presenting invention, during burn-in/load testing of the UPS 110, should it be determined that the UPS is faulty and needs to be repaired or serviced, or should it be determined that the UPS is to be replaced, the UPS may be electrically and mechanically decoupled form the MBP with access from only the UPS side. For example, with reference to FIGS. 5A-5C, a service technician can power down the UPS, remove the UPS side cover 561, and remove the threaded bolts (that are inserted in apertures 532 and 534) that electrically and mechanically couple each contact 505 of the UPS to the UPS/MBP busbar 500 to separate the UPS from the MBP for service, repair, or replacement. Upon service, repair or replacement of the UPS, these threaded bolts may be re-inserted and tightened, and the UPS load-tested to ensure proper operation prior to reconnecting the UPS to the load. After verifying that the UPS is operating properly, the UPS may be shut down, the load-test/burn-in busbars 520 removed, the UPS powered back on, and the UPS returned to service by closing switch 134, opening switch 138 and closing switch 136. It should be appreciated that when the UPS (or a replacement UPS) is returned to service, it may even be unnecessary to check whether the connection between each UPS/MBP busbar 500 and the MBP is secure, as this connection need not be broken to service, repair or replace the UPS, or to install or remove the load-test/burn-in busbars 520. Moreover, as with the single mains configuration of FIG. 6A, it should further be appreciated that to perform burn-in/load testing in a dual mains configuration, the installation and/or removal of the load-test/burn-in busbar 520 (via a threaded bolt inserted through the aperture 521), and the burn-in/load testing of the UPS may be performed without loosening or tightening any of the bolts that electrically and mechanically couple the UPS/MBP busbar 500 to either the UPS or the MBP. Thus, to perform burn-in testing or load testing in a dual mains configuration, the load-test/burn-in busbar 520 can be installed, the UPS tested, and the load-test/burn-in busbar 520 removed without ever accessing any of the bolts received in any of apertures 532, 534, 542, and 544 that electrically and mechanically couple the UPS/MBP busbar 500 to either the UPS or the MBP.

FIGS. 7A-7D illustrate a second embodiment of a UPS/MBP busbar that may be used in a high availability power system that includes a UPS and a maintenance bypass panel in accordance with an aspect of the present invention. As shown in FIGS. 7A-D, the UPS/MBP busbar 700 of this embodiment is a multi-part structure formed of a conductive material, such as aluminum or copper, although other conductive materials may alternatively be used. The UPS/MBP busbar 700 includes a UPS interface (i/f) busbar 701 and a UPS/MBP link busbar 702, which in one embodiment, are each made of copper. In its assembled form shown in FIG. 7A, the UPS/MBP busbar 700 includes a UPS contact region 730 formed on one end the UPS i/f bus bar 701, and a MBP contact region 740 formed on an opposing end of the UPS/MBP link busbar 702, with a substantially U-shaped measurement access region 710 defined there between. As shown, the UPS contact region 730 and the MBP contact region 740 are each substantially perpendicular to the U-shaped measurement access region 710, and the UPS contact region 730 and the MBP contact region 740 are substantially perpendicular to one another. The measurement access region 710 is configured to permit the measurement of currents and voltages using conventional current/voltage meters, as discussed further below. The UPS contact region 730 is configured to be electrically and mechanically coupled to a contact 505 of an input or output 17, 24, 25, or 26 (FIG. 3) of the UPS, and the MBP contact region 740 is configured to be electrically and mechanically coupled to an MBP busbar 550. The UPS contact 505 and the MBP busbar 550 may each be formed from conductive materials, such as aluminum, or copper, for example.

Figure 7C:
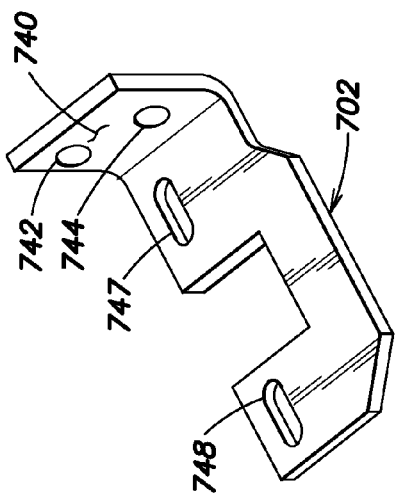
FIG. 7C is a perspective view of a second portion of the UPS/MBP busbar of FIG. 7A.
Figure 7A:
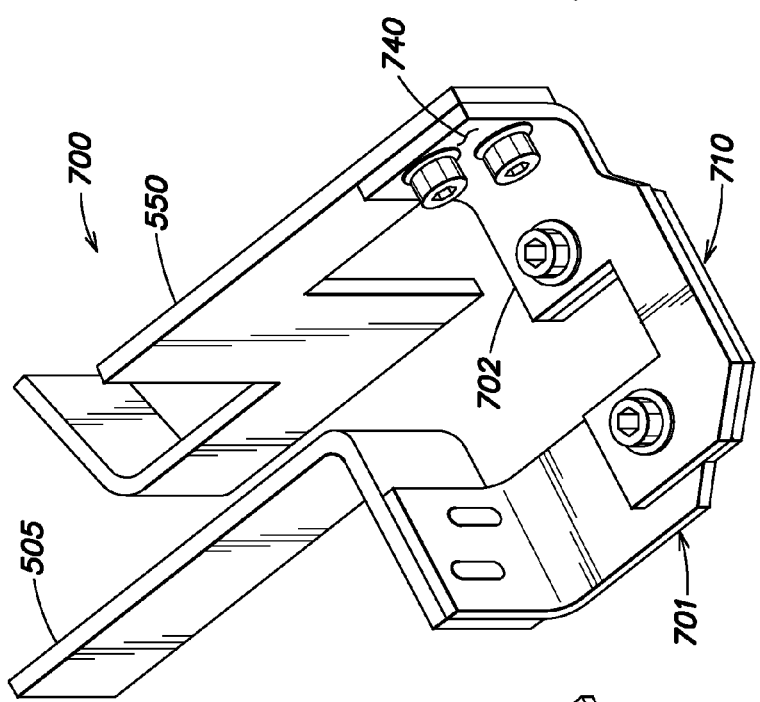
FIG. 7A is a perspective view of a UPS/MBP busbar in accordance with another embodiment of the present invention that may be used in a high availability power system.
Figure 7B:
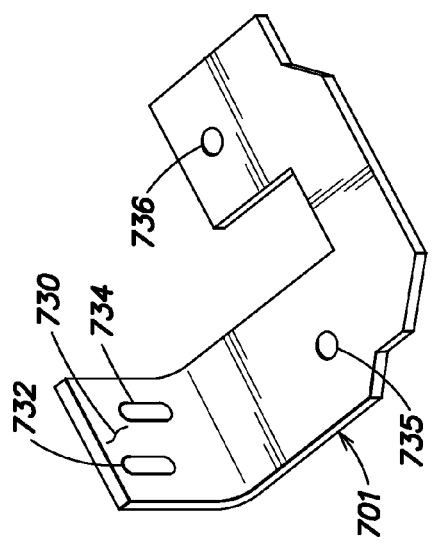
FIG. 7B is a perspective view of a portion of the UPS/MBP busbar of FIG. 7A.

As shown most clearly in FIG. 7B, the UPS contact region 730 of the UPS i/f busbar 701 includes a plurality of apertures 732, 734 each to receive a fastener, such as a threaded bolt (not shown) to electrically and mechanically couple the UPS i/f busbar 701 to a contact 505 of the UPS. In one implementation, captivated nuts (not shown) are attached (e.g., by press-fit or by welding) to a back surface of the contact 505 to receive the bolts, such that electrical and mechanical connection and disconnection of the UPS/MBP busbar 700 may be made with access only from the UPS side. As shown in FIG. 7B, each of the apertures 732, 734 may be formed as slots to tolerate some amount of misalignment in a particular direction. The UPS i/f busbar 701 also includes a plurality of additional apertures 735, 736 each to receive a threaded bolt (shown in FIGS. 7A and 7D) that electrically and mechanically couple the UPS i/f busbar 701 to the MBP link busbar 702. Although not shown, captivated nuts (e.g., press-fit or welded) may be provided on an undersurface of the UPS i/f busbar 701 adjacent each of the apertures 735, 736 to receive a respective bolt.

The MBP contact region 740 of the UPS/MBP link busbar 702 also includes a plurality of apertures 742, 744 each to receive a fastener, such as a threaded bolt (shown in FIGS. 7A and 7D) to electrically and mechanically couple the UPS/MBP link busbar 702 to an MBP busbar 550 (FIG. 7A) internal to the MBP. Although not visible in the figures, the MBP busbar 550 may include a plurality of captivated nuts disposed on a back surface of the MBP busbar 550, each to receive a respective one of the threaded bolts that electrically and mechanically couple the UPS/MBP link busbar 702 to the MBP busbar 550. Each of the apertures 742, 744 may have a diameter that is sufficiently larger than that of the threaded bolt to be received therein to accommodate some amount of misalignment. Alternatively, each of the apertures 742, 744 may be formed as slots to again accommodate some amount of misalignment in a particular direction. Advantageously, the UPS/MBP link busbar 702 may be electrically and mechanically coupled to the MBP busbar 550, and electrically and mechanically decoupled from the MBP busbar 550 with access from only the UPS side. It should be appreciated that other forms of attachment may be used to permit attachment of the UPS/MBP busbar 700 to the UPS and the MBP with access from only the UPS side. For example, rather than having captivated nuts on the back surface of contact 505 and the back surface of the MBP busbar 550, captivated bolts may instead be used, each to receive a respective nut.

Figure 7D:
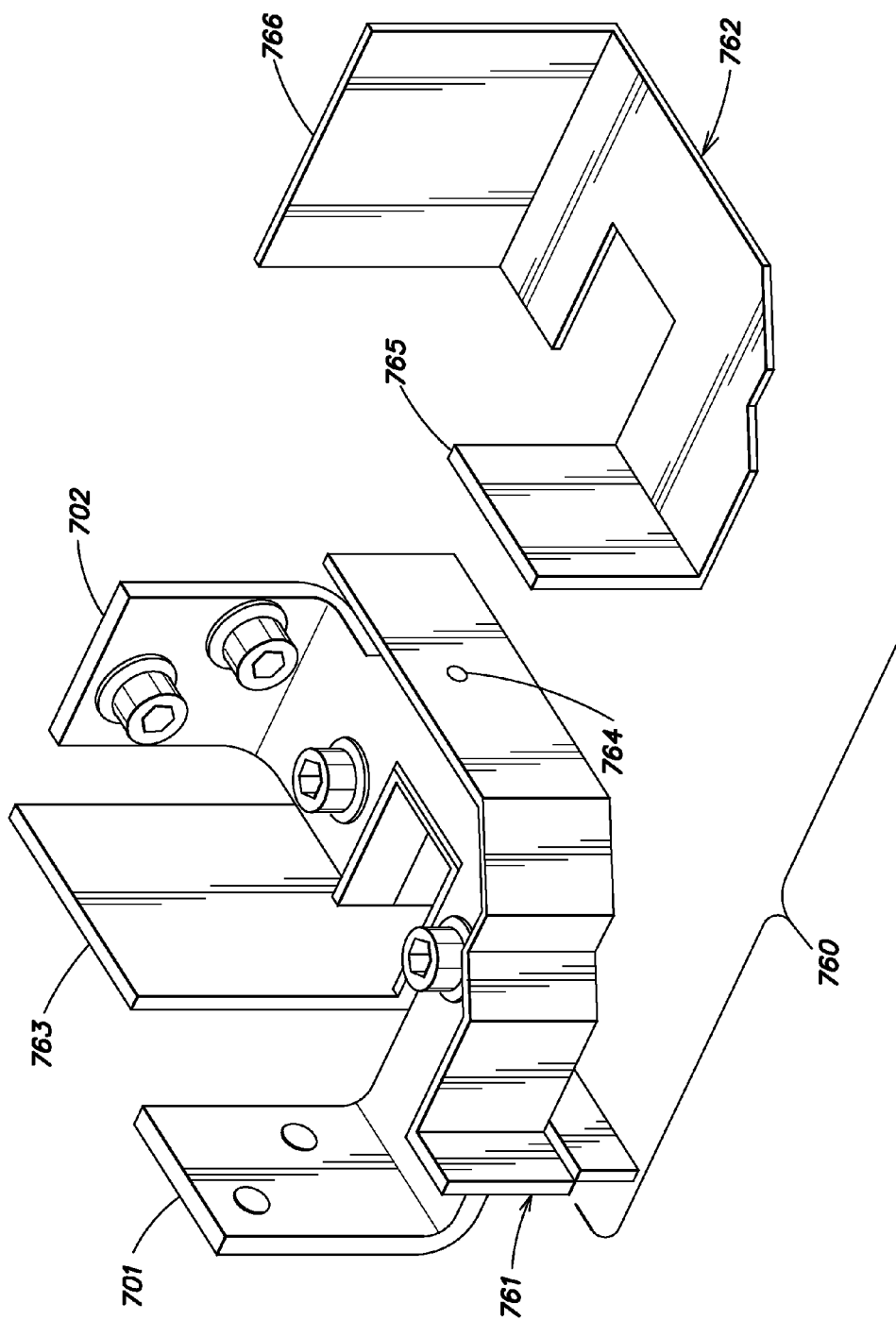
FIG. 7D is a perspective view of the UPS/MBP busbar of FIGS. 7A-7C showing a protective cover in accordance with an embodiment of the present invention.

The UPS/MBP link busbar 702 also includes a plurality of apertures 747, 748, that permit the UPS/MBP link busbar 702 to be electrically and mechanically connected to the UPS i/f busbar 701. As shown in FIGS. 7A and 7D, a respective fastener, such as a bolt is inserted into apertures 747 and 748 from above, received in a respective captivated nut disposed on an underside of the UPS i/f busbar 701, and tightened to electrically and mechanically couple the UPS i/f busbar 701 to the UPS/MBP link busbar 702. In the embodiment illustrated, each of the apertures 747, 748 is formed as a slot to again tolerate some amount of misalignment between the UPS and the MBP. It should be appreciated that the UPS/MBP busbar 700 may also include a mechanism to permit load testing and/or burn in testing of the UPS while the UPS is not operatively connected to the load, and/or while the load is being provided with power from an AC power source. For example, a crimped or soldered circular-shaped or spade-shaped terminal lug that is attached to an insulated cable may be electrically and mechanically coupled to the UPS/MBP busbar 700 by the threaded bolt that is received in either of apertures 747 and 748. An opposing end of the cable may then be attached to a similar location on another UPS/MBP busbar 700 corresponding to another input of the same phase to permit load testing or burn in testing as described in detail further below. Alternatively, a crimped or soldered terminal lug that is attached to an insulated cable may be electrically and mechanically coupled to the input or output contact 505 of the UPS by a threaded bolt received in either of apertures 732 or 734 of the UPS i/f link busbar 701, or alternatively still, by a threaded bolt received in either of apertures 742, 744 of the UPS/MBP link busbar 702. It should be appreciated that the use of a multipart structure such as depicted in FIGS. 7A-D permits the UPS/MBP busbar 700 to accommodate some amount of misalignment in a variety of different directions.

As shown in FIG. 7D (and also visible in FIGS. 7I and 7J), and in accordance with an aspect of the present invention, the UPS/MBP busbar 700 may include a protective cover 760 to prevent exposure to hazardous currents or voltages carried by the UPS/MBP busbar 700 while still permitting service personnel to measure voltages and/or currents carried by the UPS/MBP busbar 700 during operation of the UPS and MBP. In accordance with one embodiment, the protective cover 760 is formed from an electrically insulating material, such as plastic, although other insulating materials may alternatively be used. In accordance with one embodiment, the protective cover 760 includes a bottom cover 761 and a top cover 762.

The bottom cover 761 and the top cover 762 are disposed in registration with a bottom surface and a top surface of the UPS/MBP busbar 700, respectively. Each of the bottom cover 761 and the top cover 762 are formed (e.g., molded) with mating features (not shown) to permit the respective covers to be removably attached to the UPS/MBP busbar 700 and form an interlocking assembly. For example, the bottom cover 761 may include ribs to engage upper and lower surfaces of the UPS/MBP busbar 700 to releasably secure the bottom cover 761 to the UPS/MBP busbar 700, and the top cover 762 may include ribs that engage the upper edges of the bottom cover 761 to form an interlocking assembly. It should be appreciated that embodiments of the present invention are not limited to any particular mating features, as numerous alternative designs could be used, as known to those skilled in the art. The bottom cover 761 includes an upwardly extending flange 763 to prevent accidental exposure to the region between the input or output contact 505 of the UPS and the MBP busbar 550 and also protects against accidental exposure with the bottom and side surface of the UPS/MBP busbar 700. The top cover 762 includes two upwardly extending flanges 765 and 766. The flange 765 prevents accidental exposure to the UPS contact region 730 and the input or output contact 505 of the UPS, and the flange 766 prevents accidental exposure to the MBP contact region 740 and the MBP busbar 550 (see also FIGS. 7I and 7J).

As shown in FIG. 7D, the bottom cover 761 may include a measurement aperture 764 similar in function to the measurement aperture 564 of the embodiment of FIGS. 5A-I to enable a voltage probe to be inserted into the measurement aperture 764 and to electrically contact the UPS/MBP busbar 700, thereby enabling voltage measurements while the protective cover 760 is in place. In one embodiment, the measurement aperture 764 has a diameter of approximately 4 mm or less and is dimensioned to comply with International Protection Rating Code 2X (IP2X), although some embodiments may include a smaller measurement aperture to comply with IP Code 3X (IP3X). Such a small diameter permits measurement tools, such as a voltage probe of a voltmeter or current clamp to be inserted into the measurement aperture 764, while preventing the ingress of larger objects, such as a finger. Although the measurement aperture 764 is shown as having a circular shape, it should be appreciated that the present invention is not so limited, as other shapes may be used.

Although the UPS/MBP busbar 700 has been shown and described as a multipart structure, it should be appreciated that it could alternatively be formed as a single integral assembly that is attached to the UPS and/or MBP during installation or removal of the UPS. Such an integral assembly is described in detail further below with respect to FIGS. 7E-7G.

FIGS. 7E-7G illustrate a third embodiment of a UPS/MBP busbar that may be used in a high availability power system that includes a UPS and a maintenance bypass panel in accordance with an aspect of the present invention. The UPS/MBP busbar 700 of FIGS. 7E-7G is similar to the embodiment described above with respect to FIGS. 7A-D. However, rather than being formed as a multipart structure as depicted in FIGS. 7A-D, the UPS/MBP busbar 700 of this embodiment is formed as a unitary structure. As shown in FIGS. 7E-7G, the UPS/MBP busbar 700 is again formed from a conductive material such as aluminum or copper, although other conductive materials may alternatively be used. The UPS/MBP busbar 700 again includes a UPS contact region 730 formed on one end the UPS/MBP busbar and a MBP contact region 740 formed on an opposing end of the UPS/MBP busbar, with a substantially U-shaped measurement access region 710 defined there between. As in the embodiment of FIGS. 7A-7D, the UPS contact region 730 and the MBP contact region 740 are again each substantially perpendicular to the U-shaped measurement access region 710, and the UPS contact region 730 and the MBP contact region 740 are substantially perpendicular to one another. The measurement access region 710 is configured to permit the measurement of currents and voltages using conventional current/voltage meters, as discussed further below. The UPS contact region 730 is configured to be electrically and mechanically coupled to a contact 505 of an input or output 17, 24, 25, or 26 (FIG. 3) of the UPS, and the MBP contact region 740 is configured to be electrically and mechanically coupled to an MBP busbar 550. The UPS contact 505 and the MBP busbar 550 may each be formed from conductive materials, such as aluminum, or copper, for example.

As shown most clearly in FIG. 7G, the UPS contact region 730 of the UPS/MBP busbar 700 includes a plurality of apertures 732, 734 each to receive a fastener, such as a threaded bolt (not shown) to electrically and mechanically couple the UPS/MBP busbar 700 to a contact 505 of an input or an output 17, 24, 25, or 26 (FIG. 3) of the UPS. In one implementation, captivated nuts (not shown) are attached (e.g., by press-fit or by welding) to a back surface of the contact 505 to receive the bolts, such that electrical and mechanical connection and disconnection of the UPS/MBP busbar 700 of this embodiment may also be made with access only from the UPS side. As shown in FIG. 7G, each of the apertures 732, 734 may be oversized to tolerate some amount of misalignment between the UPS/MBP busbar 700 and the contact 505 of the UPS in a plurality of directions. As shown in FIGS. 7E and 7F, a conductive plate 750 having apertures 752, 754, and 756 is placed adjacent to the UPS contact region 730. Apertures 752 and 754 are smaller in diameter than the corresponding apertures 732, 734 in the UPS/MBP busbar 700 and are configured to receive the bolts (not shown) that couple the UPS/MBP busbar 700 to the contact 505 of the UPS. Aperture 756 is configured to receive a protruding edge or lip 769 of an upwardly extending post 768 that is formed in a bottom cover 761 of a protective cover and hold the conductive plate 750 in a position adjacent the UPS contact region 730 of the UPS/MBP busbar 700. The conductive plate 750 thus acts as a conductive washer that is held in position by the protruding edge 769 of the post 768 and which prevents the heads of the bolts that couple the UPS/MBP busbar to the contact 505 of the UPS from slipping through oversized apertures 732 and 734 of the UPS contact region 730, while tolerating misalignment in a plurality of different directions. Although the aperture 756 is shown as having a square shape, it should be appreciated that other shapes (such as a circle) may be used, provided that the aperture is sufficiently large to permit alignment of the apertures 752, 754 of the conductive plate 750 with the corresponding apertures 732, 734 in the UPS contact region 730 of the UPS/MBP busbar.

As with the embodiment of FIGS. 7A-D, the MBP contact region 740 of the UPS/MBP busbar 700 of FIGS. 7E-G again includes a plurality of apertures 742, 744 each to receive a fastener, such as a threaded bolt (not shown) to electrically and mechanically couple the UPS/MBP busbar 700 to an MBP busbar 550 internal to the MBP in a manner similar to that shown in FIG. 7A. As previously described, the MBP busbar 550 may include a plurality of captivated nuts disposed on a back surface of the MBP busbar 550, each to receive a respective one of the threaded bolts that electrically and mechanically couple the UPS/MBP busbar 700 to the MBP busbar 550. Each of the apertures 742, 744 may have a diameter that is sufficiently larger than that of the threaded bolt to be received therein to accommodate some amount of misalignment. Alternatively, each of the apertures 742, 744 may be formed as slots as shown to again accommodate some amount of misalignment in a particular direction. Advantageously, the UPS/MBP busbar 700 may be electrically and mechanically coupled to the MBP busbar 550, and electrically and mechanically decoupled from the MBP busbar 550 with access from only the UPS side. It should be appreciated that other forms of attachment may be used to permit attachment of the UPS/MBP busbar 700 to the UPS and the MBP with access from only the UPS side. For example, rather than having captivated nuts on the back surface of contact 505 and the back surface of the MBP busbar 550, captivated bolts may instead be used, each to receive a respective nut.

The UPS busbar 700 of FIGS. 7E-G also includes an aperture 749 to receive a fastener, such as a threaded bolt (not shown) that electrically and mechanically couples a terminal lug 720 to the UPS/MBP busbar 700. Although not shown, a captivated nut (e.g., press-fit or welded) may be provided on an undersurface of the UPS/MBP busbar 700 adjacent the aperture 749 to receive the bolt. Although not illustrated in FIGS. 7E-G, an insulated cable may be attached, for example, by welding or crimping to the terminal lug 720, to permit load testing or burn-in testing of a UPS. An opposing end of the cable, which may also include an attached terminal lug, may be electrically and mechanically connected to a similar location on another UPS/MBP busbar 700 corresponding to another input of the same phase to permit load testing or burn-in testing as described in detail further below.

To prevent exposure to hazardous currents or voltages carried by the UPS/MBP busbar 700, the UPS/MBP busbar 700 of FIGS. 7E-G may also include a protective cover that permits service personnel to measure voltages and/or currents carried by the UPS/MBP busbar 700 during operation of the UPS and MBP. As with the protective cover 760 shown in FIG. 7D, the protective cover of this embodiment may again include a bottom cover 761 and a top cover (not shown) that are made of plastic or another type of electrically insulating material. As depicted in FIGS. 7E-G, the bottom cover 761 may be formed (e.g., molded) to include the post 768 and lip 769, and a protrusion 767 that permits the threaded bolt that attaches the terminal lug 720 to the UPS/MBP busbar 700 to be received within the aperture 749 of the UPS/MBP busbar 700 with the captivated nut disposed there below, while preventing any exposure with conductive surfaces of the threaded bolt, the captivated nut, or the undersurface or side surfaces of the UPS/MBP busbar 700. The bottom cover 761 may again include a measurement aperture 764 to permit a voltage probe to be inserted into the measurement aperture 764 and to electrically contact the UPS/MBP busbar 700, thereby enabling voltage measurements while the protective cover is in place. As with the previous embodiments, the measurement aperture 764 may have a diameter of approximately 4 mm or less and may be dimensioned to comply with International Protection Rating Codes 2X (IP2X) or 3X (IP3X). Such a small diameter again permits measurement tools, such as a voltage probe of a voltmeter or current clamp to be inserted into the measurement aperture 764, while preventing the ingress of larger objects, such as a finger. As with the previously described embodiment of FIG. 7D, the bottom cover 761 may be formed with mating features, such as ribs, to permit the bottom cover to be removably attached to the UPS/MBP busbar 700.

Although not shown in FIGS. 7E-7G, the top cover of the protective cover used with this embodiment may be similar in construction to top cover 762 of FIG. 7D. For example, the top cover may include an upwardly extending flange to prevent exposure to the UPS contact region 730 and the input or output contact 505 of the UPS, and another upwardly extending flange to prevent exposure to the MBP contact region 740 and the MBP busbar 550. The top cover of this embodiment may further include a protrusion to accommodate the presence of the post 768 formed in the bottom cover 761, and in certain embodiments, the top cover may further include a protrusion to accommodate the presence of terminal lug 720 and the attached cable, such that in a dual mains configuration, load testing and/or burn-in testing of the UPS may be performed with both the top cover and the bottom cover of the protective cover in place.

Figure 7H:
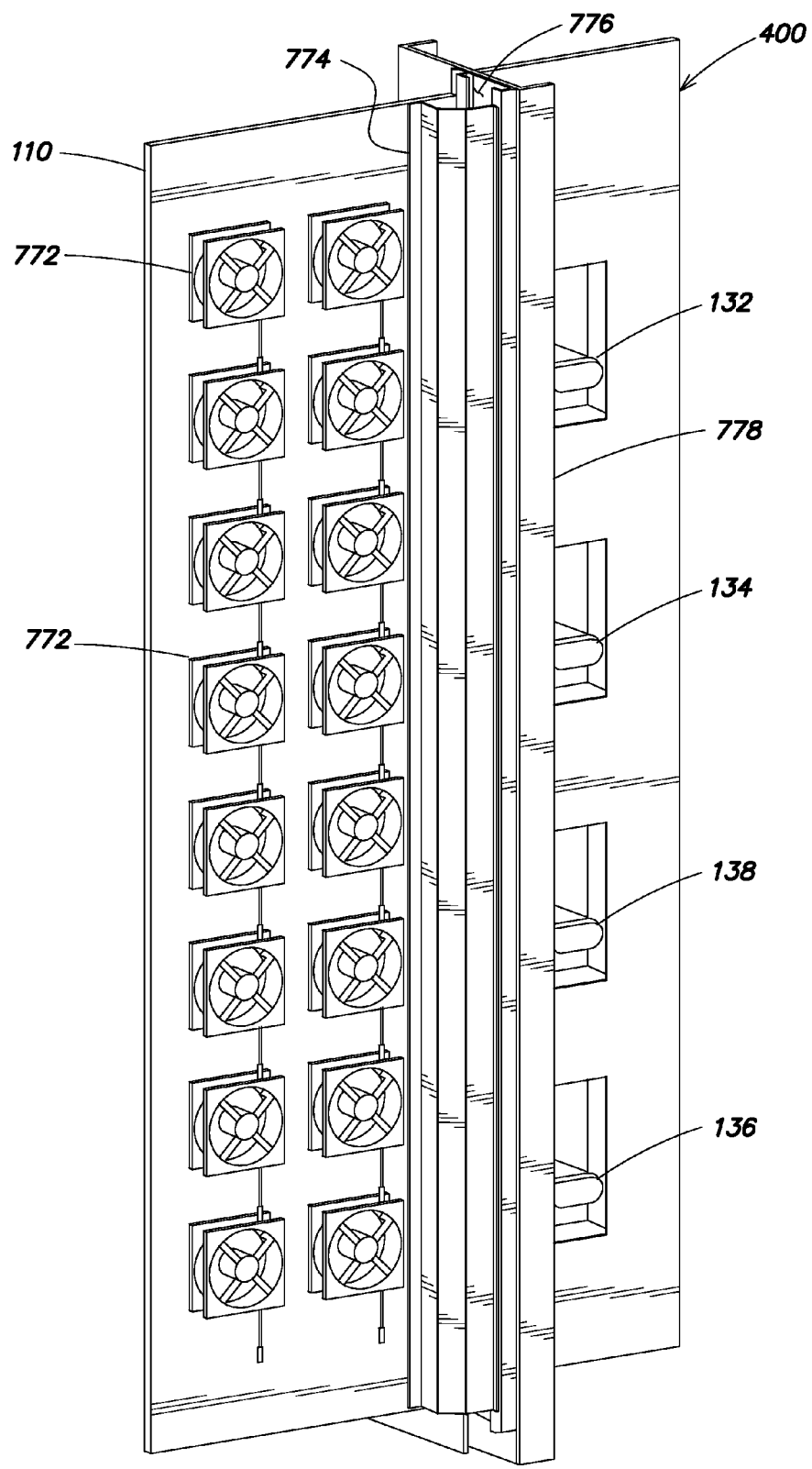
FIG. 7H is a perspective view of a high availability power system power system in accordance with an embodiment of the present invention that includes a UPS system and an MBP.
Figure 71:
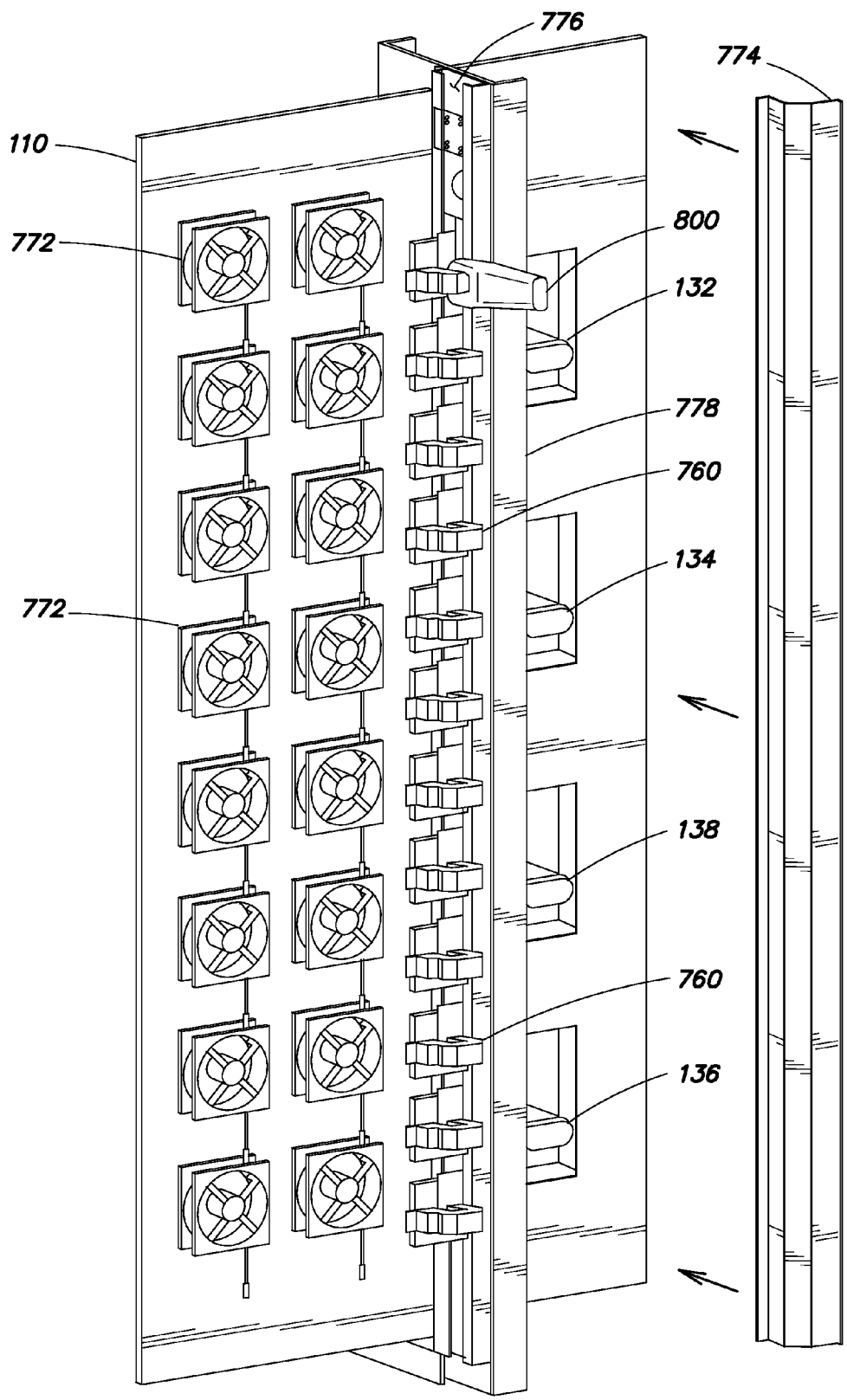

FIG. 7H is a partial front perspective view of an embodiment of a high availability power system that includes a UPS 110 and a MBP 400 in which inputs and outputs of the UPS and MBP are interconnected by UPS/MBP busbars 700 and protected by a protective cover 760. Typically, the view shown in FIG. 7H would be provided after opening or removing a front cover (not shown) of the UPS that obscures the elements of the UPS that are visible in FIG. 7H and further protects personnel from accidental contact with voltages and currents inside the UPS and/or MBP. In such a configuration, the UPS 110 may be disposed in a rack with the MBP 400 disposed in an adjacent rack, or alternatively, each of the UPS 110 and the MBP 400 may be free-standing systems disposed in adjacent cabinets.

As shown, a front surface of the UPS 110 includes a plurality of fans 772 for cooling the UPS during operation and an interface cover 774 that shields the UPS/MBP busbars 700 from accidental contact. The interface cover 774 may be formed from plastic or steel, although other materials (conductive or non-conductive) may alternatively be used. The interface cover 774 may be spring fit to fit within a rail of a corner pillar 776 of the UPS, or may alternatively be fastened to the UPS by bolts or screws (not shown). Visible in FIGS. 7H and 7I are the switches 132, 134, 136, and 138 of the MBP 400 previously described with respect to FIGS. 4A-4C.

Figure 7J:
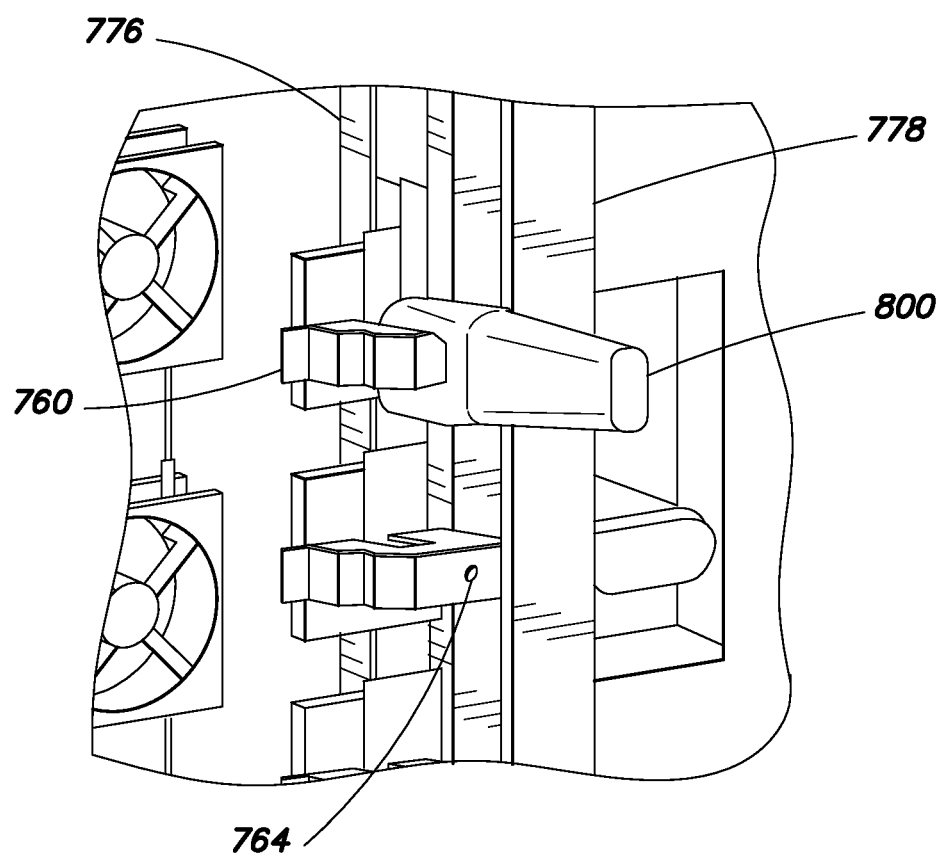
FIG. 7J is an exploded perspective view of FIG. 7I.

FIG. 7I is a partial front perspective view of the high availability power system of FIG. 7H, but with the interface cover 774 removed. As shown in FIG. 7I, each of the twelve (or eleven) UPS/MBP busbars 700 are protected against accidental contact by a respective protective cover 760. Although the UPS/MBP busbars 700 are protected against accidental contact, currents carried by each of the UPS/MBP busbars may be measured by use of a conventional current clamp 800 by simply opening the jaws of the clamp 800 and then closing them around the measuring access region 710 of the UPS/MBP busbar 700. Voltage measurements may be made by simply inserting a voltage probe into the measurement aperture 764 that is illustrated in the exploded front perspective view of FIG. 7I that is shown in FIG. 7J. It should be appreciated that because exposure to voltages and currents inside the UPS and MBP is prevented by the presence of the protective covers 760 over the UPS/MBP busbars 700, certain embodiments may omit the interface cover 774 entirely, such that the view shown in FIG. 7I may be provided simply by opening or removing a front cover of the UPS. In such embodiments, the front cover of the UPS may include a locking mechanism to prevent inadvertent access during burn-in testing or load testing as described more fully below.

In accordance with an aspect of the present invention, burn-in testing or load testing of a power system that includes a UPS and an MBP wherein the UPS and MBP are electrically and mechanically coupled together by a plurality of UPS/MBP busbars 700, such as described above with respect to FIGS. 7A-7I may be performed in a manner similar to that described above with respect to FIGS. 6A and 6B.

Referring back to the single mains configuration of FIG. 6A, an AC power source may be connected to either of inputs 124 or 125. Inputs 124 and 125 may be connected to one another either by interconnect 131 that is internal to the MBP 400, or by an insulated cable that is connected between a UPS/MBP busbar 700 of input 127 of the UPS 110, and another UPS/MBP busbar 700 of input 128 of the UPS corresponding to a same phase of input power. As noted previously with respect to FIG. 6A, where interconnect 131 is used, inputs 124 and 125 of the MBP 400 are interconnected on the MBP side of switches 132 and 134, and where an insulated cable is used, inputs 127 and 128 of the UPS 110 are interconnected on the UPS side of switches 132 and 134. It should be appreciated that in a single mains configuration, the use of interconnect 131 may be preferred over the use of insulated cables, as the presence of the cables may require removal of the top cover 762 to accommodate the presence of the cables.

To perform load testing or burn-in of the UPS 110 in the single mains configuration shown in FIG. 6A, switches 132, 134, and 138 are closed and switch 136 is open. As a result, AC power provided to the output 26 of the UPS 110 is looped back through the bypass switch 23, flows through the interconnect 131 (or alternatively through the insulated cables) and back into the input 127 of the UPS 110 along burn-in/load-test path 610, as shown in dashed line form in FIG. 6A. Voltages and currents of the UPS 110 may be measured during load/burn-in testing by accessing the measurement region 710 of a UPS/MBP busbar 700 (FIGS. 7A-7I), for example, by inserting a voltage measurement probe into measurement aperture 764, or by placing the jaws of a current clamp 800 about the measurement access region 710, as shown in FIG. 7J. In accordance with an aspect of the present invention, these voltage and current measurements may be made without exposing the person making those measurements to direct contact with the UPS/MBP busbars 700 carrying those voltages and currents. Moreover, as load testing or burn-in testing of the UPS 110 is being conducted, AC power continues to be provided to the load by virtue of the switch 138 being closed.

In accordance with an aspect of the present invention, during burn-in/load testing of the UPS 110, should it be determined that the UPS is faulty and needs to be repaired or serviced, or should it be determined that the UPS is to be replaced, the UPS may be electrically and mechanically decoupled from the MBP, with access from only the UPS side. For example, with reference to FIGS. 7A-7G, a service technician can power down the UPS and remove the threaded bolts (that are inserted in apertures 732 and 734) that electrically and mechanically couple each contact 505 of the UPS to the UPS/MBP busbar 700 to separate the UPS from the MBP for service, repair, or replacement. Alternatively, the threaded bolts that are inserted in apertures 747 and 748 (FIGS. 7A-7D) that electrically and mechanically couple the UPS i/f busbar 701 to the UPS/MPB link busbar 702 may be removed, or alternatively still, the threaded bolts that are received in apertures 742 and 744 of the UPS/MBP busbar 700 may be removed to electrically and mechanically decouple the UPS from the MBP. Upon service, repair or replacement of the UPS, those threaded bolts that were removed may be re-inserted and tightened, and the UPS load tested or burn-in tested to ensure proper operation prior to reconnecting the UPS to the load by opening the switch 138 and closing the switch 136. It should be appreciated that when the UPS (or a replacement UPS) is returned to service, and dependent upon which of the threaded bolts were removed, it may again not even be necessary to check whether the connection between each UPS/MBP busbar 700 and the MBP is secure, as the connection between the UPS/MBP busbar 700 and the MBP busbar 550 of the MBP need not be broken to service, repair or replace the UPS. Moreover, it should further be appreciated that irrespective of whether an interconnect 131 is used to connect inputs 124 and 125 together, or whether an insulated cable is used to connect busbars 700 corresponding to a same phase of inputs 127 and 128 of the UPS together, the burn-in/load testing in a single mains configuration need not require accessing any of the bolts that electrically and mechanically couple the UPS/MBP busbar 700 to either the UPS or the MBP. For example, where any one of apertures 747, 748, or 749 is used to attach the insulating cable, the installation and/or removal of the insulated cable (via a threaded bolt inserted through any one of apertures 747, 748, or 749), and the burn-in/load testing of the UPS may be performed without loosening or tightening any of the bolts (received in apertures 732, 734, 742, or 744) that electrically and mechanically couple the UPS/MBP busbar 700 to either the UPS or the MBP.

The burn-in testing or load testing of a dual mains power system that includes a UPS and an MBP that are interconnected by UPS/MBP busbars 700 while supplying power to a load may be performed in a manner analogous to that described previously with respect to FIG. 6B. Referring back to FIG. 6B, a first AC power source (Mains1) can be coupled to the first input 124 of the MBP and a second AC power source (Mains2) can be coupled to the second input 125 of the MBP. In such a dual mains configuration, the interconnect 131 would typically be removed during installation of the power system 600B. To perform service, repair or replacement of the UPS, switches 132, 134, and 136 would be opened, and switch 138 closed so that AC power may be provided to the load via Mains2, while the UPS is electrically isolated from Mains1, Mains2, and the load. The UPS would typically then be powered down. With the UPS in a powered-down state, the top cover 762 of the protective cover 760 would be removed, and insulated cables connecting busbars 700 of the input 127 of the UPS may be connected to busbars 700 of a corresponding phase of input 128 to electrically couple the first input 127 of the UPS to the second input 128 of the UPS. Dependent upon whether the top cover 762 is able to accommodate the presence of the terminal lug and insulated cable, the top cover may be re-installed in its prior position, or simply set aside for re-installation after burn-in/load testing is complete. Where the top cover is not returned to it prior position, a front cover of the UPS may be locked to avoid inadvertent exposure to voltages and currents during burn-in or load testing.

To perform load testing or burn-in of the UPS 110 in the dual mains configuration shown in FIG. 6B, switch 132 would be closed, with switches 134 and 136 being maintained in an open position and with switch 138 being maintained in a closed position to continue providing AC power to the load via Mains2. In this state, the UPS would be powered on to perform burn-in/load testing of the UPS. As a result, AC power provided to the output 26 of the UPS 110 is looped back through the bypass switch 23, flows through the cables interconnecting the input 128 of the UPS to the input 127 and back into the UPS 110 along burn-in/load-test path 610, as shown in dashed line form in FIG. 6B. Where the top cover 762 is able to accommodate the presence of the terminal lug and insulated cable, voltages and currents of the UPS 110 may again be measured during load-test/burn-in by accessing the measurement region 710 of a UPS/MBP busbar 700 (FIGS. 7A-7I), for example, by inserting a voltage measurement probe into measurement aperture 764, or by placing the jaws of a current clamp 800 around the measurement region 710 of a respective UPS/MBP busbar 700, as shown in FIG. 7I. In accordance with an aspect of the present invention, these voltage and current measurements may be made without exposing the person making those measurements to direct contact with the UPS/MBP busbars 700 carrying those voltages and currents, as direct contact with the UPS/MBP busbars is prevented by protective cover 760. Moreover, as load-test or burn-in of the UPS 110 is being conducted, AC power continues to be provided to the load by virtue of the switch 138 being closed.

In accordance with an aspect of the presenting invention, during burn-in/load testing of the UPS 110, should it be determined that the UPS is faulty and needs to be repaired or serviced, or should it be determined that the UPS is to be replaced, the UPS may be electrically and mechanically decoupled form the MBP with access from only the UPS side. For example, with reference to FIGS. 7A-7G, a service technician can power down the UPS and remove the threaded bolts that are inserted in apertures 732 and 734, or those inserted in apertures 747 and 748 (FIGS. 7A-7D) to separate the UPS from the MBP for service, repair, or replacement. Upon service, repair or replacement of the UPS, those threaded bolts may be re-inserted and tightened, and the UPS load-tested to ensure proper operation prior to reconnecting the UPS to the load. After verifying that the UPS is operating properly, the UPS may be shut down, the top cover 762, if present, removed, and the cables interconnecting the input 127 of the UPS to the input 128 removed. The top cover 762 may then be returned to its position, the UPS powered back on, and the UPS returned to service by closing switch 134, opening the switch 138 and closing the switch 136. It should be appreciated that when the UPS (or a replacement UPS) is returned to service, and depending on which threaded bolts were removed, it may even be unnecessary to check whether the connection between each UPS/MBP busbar 700 and the MBP is secure, as this connection need not be broken to service, repair or replace the UPS, to install or remove the load-test/burn-in busbars (or insulated cables) used for burn-in or load testing, or to perform burn-in testing or load testing of the UPS.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A high availability power system, comprising:
an uninterruptible power system having an input to receive input power and an output to provide output power;
a maintenance bypass panel having an input to receive the output power provided by the uninterruptible power system and an output to provide the input power to the input of the uninterruptible power system;
a busbar, formed from a conductive material and having a first contact region configured to electrically and mechanically couple to one of the input and the output of the uninterruptible power system, a second contact region configured to electrically and mechanically couple to one of the input and the output of the maintenance bypass panel, the busbar configured to conduct power between the uninterruptible power system and the maintenance bypass panel; and
a cover formed from an insulating material and configured to be attached to the busbar and to permit at least one measurement of the power conducted by the busbar while preventing accidental contact with the busbar.

2. The high availability power system of claim 1, wherein the cover is further configured to permit access to the first contact region to electrically and mechanically decouple the one of the input and the output of the uninterruptible power system from the one of the input and the output of the maintenance bypass panel.

3. The high availability power system of claim 1, wherein the cover is further configured to permit access to the first contact region to electrically and mechanically decouple the one of the input and the output of the uninterruptible power system from the one of the input and the output of the maintenance bypass panel without physically accessing the second contact region.

4. The high availability power system of claim 1, wherein the cover further includes a measurement aperture having an opening that is approximately four millimeters or less in diameter and configured to permit measurement of a voltage conducted by the busbar.

5. The high availability power system of claim 1, wherein the busbar and the cover are configured to permit a current clamp to measure an electric current conducted by the busbar.

6. The high availability power system of claim 1, wherein the maintenance bypass panel further includes a frame having a front cover with a measurement access window, the measurement access window in registration with a maintenance access region of the busbar, the maintenance access region positioned in between the first contact region and the second contact region.

7. The high availability power system of claim 1, wherein the cover includes an uninterruptible power system side cover having first mating features configured to removably attach the uninterruptible power system side cover to the first contact region, and a maintenance bypass panel side cover having second mating features configured to removably attach the maintenance bypass panel side cover to the second contact region.

8. The high availability power system of claim 7, wherein the uninterruptible power system side cover and the maintenance bypass panel side cover are constructed as an integral assembly.

9. The high availability power system of claim 8, wherein the cover further includes a measurement access cover having third mating features configured to removably attach the measurement access cover to a maintenance access region of the busbar, the maintenance access region positioned in between the first contact region and the second contact region.

10. The high availability power system of claim 1, wherein the cover includes a first cover and a second cover, the first cover configured to shield an outer surface of the busbar and having first mating features configured to removably attach the first cover to the busbar, and the second cover configured to shield an inner surface of a measurement access region of the busbar and having second mating features configured to removably attach the second cover to the measurement access region of the busbar and in registration with the first cover, wherein the measurement access region is positioned in between the first contact region and the second contact region.

11. The high availability power system of claim 1, wherein the busbar is further configured to electrically and mechanically couple the input of the uninterruptible power system to the output of the maintenance bypass panel, and wherein the busbar further includes an aperture configured to receive a fastener that removably connects a load-test/burn-in busbar to the busbar, the load-test/burn-in busbar electrically and mechanically coupling the input of the uninterruptible power system to another input of the uninterruptible power system having a same phase.

12. The high availability power system of claim 11, wherein the load-test/burn-in busbar has a rectilinear C-shape capable of being configured in one of two different orientations.

13. The high availability power system of claim 1, wherein the first contact region includes a first plurality of apertures each to receive a respective first fastener that electrically and mechanically couples the first contact region to the one of the input and the output of the uninterruptible power system, and wherein the second contact region includes a second plurality of apertures each to receive a respective second fastener that electrically and mechanically couples the second contact region to the one of the input and the output of the maintenance bypass panel.

14. A busbar for transmitting power between an uninterruptible power system and a maintenance bypass panel, comprising:
   a bar formed from a conductive material and having an uninterruptible power system contact region defined on a first portion of the bar and a maintenance bypass panel contact region defined on a second portion of the bar; and
   a cover formed from an insulating material and configured to be attached to the bar and to permit at least one measurement of power conducted by the bar while preventing accidental contact with the bar.

15. The busbar of claim 14, wherein the bar is configured to conduct power between the first portion and the second portion, and the cover is configured to permit access to the first portion of the bar to disconnect the uninterruptible power system from the maintenance bypass panel without accessing the second portion.

16. The busbar of claim 15, wherein the cover is further configured to permit access to the second portion of the bar to disconnect the maintenance bypass panel from the uninterruptible power system without accessing the first portion.

17. The busbar of claim 14, wherein the first portion is located on an outer surface of the bar and the second portion is located on an inner surface of the bar.

18. The busbar of claim 17, wherein the bar further includes a measurement access region defined on a third portion of the bar, the third portion positioned in between the first portion and the second portion and located on the outer surface of the bar and the inner surface of the bar.

19. The busbar of claim 18, wherein the cover and the third portion of the bar are configured to permit measurement of at least one of a voltage and current conducted by the bar.

20. The busbar of claim 18, wherein the cover and the third portion of the bar are configured to permit measurement of both a voltage and a current conducted by the bar.

* * * * *